(12) United States Patent
Tajima

(10) Patent No.: US 10,837,907 B2
(45) Date of Patent: *Nov. 17, 2020

(54) MULTIPLE REACTION PARALLEL MEASUREMENT APPARATUS AND METHOD FOR THE SAME

(71) Applicant: UNIVERSAL BIO RESEARCH Co., Ltd., Chiba (JP)

(72) Inventor: Hideji Tajima, Matsudo (JP)

(73) Assignee: Universal Bio Research Co., Ltd., Chiba (JP)

( * ) Notice: Subject to any disclaimer, the term of this patent is extended or adjusted under 35 U.S.C. 154(b) by 419 days.

This patent is subject to a terminal disclaimer.

(21) Appl. No.: 15/570,005

(22) PCT Filed: Apr. 27, 2016

(86) PCT No.: PCT/JP2016/063265
§ 371 (c)(1),
(2) Date: Oct. 27, 2017

(87) PCT Pub. No.: WO2016/178401
PCT Pub. Date: Nov. 10, 2016

(65) Prior Publication Data
US 2018/0156732 A1 Jun. 7, 2018

(30) Foreign Application Priority Data

May 1, 2015 (JP) ................................. 2015-094426

(51) Int. Cl.
*G01N 21/03* (2006.01)
*G01N 35/10* (2006.01)
(Continued)

(52) U.S. Cl.
CPC ..... *G01N 21/6452* (2013.01); *G01N 21/0332* (2013.01); *G01N 21/64* (2013.01);
(Continued)

(58) Field of Classification Search
CPC combination set(s) only.
See application file for complete search history.

(56) References Cited

U.S. PATENT DOCUMENTS 4,412,742 A * 11/1983 Lloyd .................. G01N 21/253
356/73
5,210,590 A 5/1993 Landa et al.
(Continued)

FOREIGN PATENT DOCUMENTS

DE 102006036171 A 1/2008
FR 2683907 A 5/1993
(Continued)

OTHER PUBLICATIONS

English Translation of International Search Report issued by the Japanese Patent Office regarding International Application No. PCT/JP2016/063265, dated Jun. 21, 2016, 2 pages.
(Continued)

*Primary Examiner* — Brian R Gordon
(74) *Attorney, Agent, or Firm* — Andrus Intellectual Property Law, LLP

(57) ABSTRACT

A multiple reaction parallel measurement apparatus is intended to measure a large number of reactions quickly, simply and with high accuracy. The apparatus includes: a plurality of light guiding paths corresponding to a plurality of reaction spot array elements, including a measuring end able to be in proximity of or in contact with each one of the reaction spots, and arranged to guide light generated by a reaction at the reaction spot to a connecting end; a measurement head arranged such that the measuring ends reach all together predetermined measurement positions of the corresponding reaction spots of the reaction spot array elements at a predetermined scan period; a light guiding path selector including a light guiding region optically connected to the connecting end; a light receiving unit; and a digital data
(Continued)

converter to obtain digital data by converting image region data obtained from the light receiving unit.

16 Claims, 11 Drawing Sheets

(51) Int. Cl.
  *G01N 21/64* (2006.01)
  *G01N 21/76* (2006.01)
  *G01N 21/78* (2006.01)
(52) U.S. Cl.
  CPC .............. *G01N 21/76* (2013.01); *G01N 21/78* (2013.01); *G01N 35/10* (2013.01); *G01N 35/1011* (2013.01); *G01N 2035/1013* (2013.01); *G01N 2035/1062* (2013.01)

(56) References Cited

U.S. PATENT DOCUMENTS

| | | | | |
|---|---|---|---|---|
| 5,589,351 | A * | 12/1996 | Harootunian | G01N 21/645 356/318 |
| 6,123,903 | A | 9/2000 | Tajima | |
| 6,573,089 | B1 * | 6/2003 | Vann | B01J 19/0046 435/287.1 |
| 6,577,391 | B1 * | 6/2003 | Faupel | A61B 5/0059 356/337 |
| 7,157,047 | B2 | 1/2007 | Tajima | |
| 7,480,042 | B1 * | 1/2009 | Phillips | G01N 21/278 356/243.1 |
| 8,921,095 | B2 | 12/2014 | Tajima | |
| 9,260,744 | B2 | 2/2016 | Tajima | |
| 9,481,906 | B2 | 11/2016 | Tajima | |
| 2001/0046673 | A1 | 11/2001 | French et al. | |
| 2002/0068698 | A1 | 6/2002 | Meyers et al. | |
| 2003/0001122 | A1 * | 1/2003 | Shimizu | G01N 21/6452 250/584 |
| 2003/0151735 | A1 * | 8/2003 | Blumenfeld | G01N 21/6428 356/73 |
| 2003/0151743 | A1 | 8/2003 | Fernando | |
| 2005/0026209 | A1 * | 2/2005 | Vann | G01N 21/6452 506/16 |
| 2006/0223172 | A1 * | 10/2006 | Bedingham | G01N 21/6452 435/288.7 |
| 2007/0065075 | A1 * | 3/2007 | Berger | G01J 3/02 385/37 |
| 2008/0142730 | A1 * | 6/2008 | Makiuchi | G01N 21/645 250/458.1 |
| 2009/0221080 | A1 | 9/2009 | Tajima | |
| 2010/0165338 | A1 * | 7/2010 | Claps | G01J 3/0205 356/317 |
| 2010/0252748 | A1 * | 10/2010 | Laitinen | G01N 21/6452 250/458.1 |
| 2012/0190034 | A1 * | 7/2012 | Tajima | G01N 21/6452 435/6.12 |
| 2013/0228675 | A1 * | 9/2013 | Chen | G01N 21/253 250/227.11 |
| 2013/0330834 | A1 | 12/2013 | Tajima | |
| 2014/0051083 | A1 | 2/2014 | Tajima | |
| 2014/0234949 | A1 * | 8/2014 | Wasson | B01L 3/0275 435/287.2 |
| 2014/0263984 | A1 * | 9/2014 | Hagen | G02B 6/4214 250/227.11 |
| 2015/0218618 | A1 * | 8/2015 | Tajima | G01N 35/00722 435/6.12 |
| 2016/0122801 | A1 | 5/2016 | Tajima | |
| 2016/0320381 | A1 * | 11/2016 | Holmes | B01L 3/0217 |
| 2018/0172597 | A1 * | 6/2018 | Tajima | G01N 21/78 |
| 2020/0217794 | A1 * | 7/2020 | Hagen | G01N 21/6486 |

FOREIGN PATENT DOCUMENTS

| | | |
|---|---|---|
| JP | 2003-294630 A | 10/2003 |
| JP | 2006-275998 A | 10/2006 |
| JP | 2008-039477 A | 2/2008 |
| JP | 2012-073195 A | 4/2012 |
| WO | 2007/029616 | 3/2007 |
| WO | 2011/016509 | 2/2011 |
| WO | 2012/105712 | 8/2012 |
| WO | 2014189085 A | 11/2014 |

OTHER PUBLICATIONS

International Written Opinion issued by the Japanese Patent Office regarding International Application No. PCT/JP2016/063265, dated Jun. 21, 2016, 5 pages.
International Preliminary Report on Patentability issued by the Japanese Patent Office regarding International Application No. PCT/JP2016/063265, dated Aug. 22, 2017, 20 pages.
Supplemental European Search Report issued by the European Patent Office regarding European Application No. 16789537.4, dated Oct. 24, 2018, 8 pages.
European Office Action for 16789537.4, dated Oct. 23, 2019.
JP Office Action (JP2017-516603) dated Jul. 17, 2020.

\* cited by examiner

MULTIPLE REACTION PARALLEL MEASUREMENT APPARATUS AND METHOD FOR THE SAME

CROSS REFERENCE

This application is a United States national phase application of co-pending international patent application number PCT/JP2016/063265, filed Apr. 27, 2016, which claims priority to Japanese patent application number 2015-094426, filed May 1, 2015, the entire disclosures of which are hereby incorporated herein by reference.

TECHNICAL FIELD

The present invention relates to a multiple reaction parallel measurement apparatus using a light guiding path such as an optical fiber, and a method for the same.

BACKGROUND ART

In recent years, tests for detecting and quantifying a specific protein among various miscellaneous proteins contained in a specimen collected from a subject or the like, is widely performed for diagnosis in the medical field, particularly for identifying infected microorganisms, or the like.

In a case where the specific protein exists in a trace amount as compared with other proteins, it is important to ensure a high level of specificity (how accurately distinguishable from contaminants) and a high level of quantitativeness (detectability even in trace amounts, or reproducibility at low concentration).

Conventionally, there is a widely used method, namely, an enzyme-linked immunosorbent assay (ELISA) method of measuring coloring and light emission based on enzymatic reaction using highly-specific antigen-antibody reaction when detecting and quantifying the concentration of antibody or antigen contained in a sample.

The ELISA method includes the following steps (steps 101 to 105). That is, a specimen solution is immobilized as a solid phase onto an inner wall surface of each of wells of a microplate having 8×12 wells, for example (step 101). Proteins (albumin, or the like) not involved in antigen-antibody reaction or enzymatic reaction are adsorbed on the solid phase (step 102). An antibody specific to the target protein is brought into contact with the solid phase to cause an antigen-antibody reaction to occur (step 103). It is assumed that the antibody is labeled with an enzyme. Excess antibody that did not react is washed off (step 104). An enzyme substrate is added and the product of the enzymatic reaction is detected (step 105).

Measurement of chemiluminescence in the above-described step 105 or measurement using fluorescence or chemiluminescence in tests such as identification of the base sequence of DNA has been usually performed by collectively and simultaneously imaging the entire planar carrier such as the microplate and the DNA chip, and analyzing with identification of an optical state of each of fixed positions on each of the wells and carriers by image analysis, or by guiding light using an optical fiber with a corresponding light receiving element provided for each of the carriers such as the well or the DNA chip (Patent Literatures 1 and 2).

Moreover, there is another apparatus that stores one or more types of target biological substances labeled with a chemiluminescent substance in one container and performs measurement using guided light onto one photomultiplier (PMT) by an optical fiber, or the like, provided in the container for the purpose of measuring the presence or absence of light emission by injecting a trigger solution (Patent Literature 3).

Furthermore, there is still another apparatus that performs measurement with one PMT by sequentially moving each of the planar carriers to the measurement position in the case of measuring the luminescence of a plurality of planar carriers (Patent Literatures 4 and 5).

Moreover, there is still another apparatus that performs measurement with one PMT by switching luminescence from a plurality of containers in order to measure the presence or absence of fluorescence and chemiluminescence in the plurality of wells of the microplate (Patent Literature 6).

CITATION LIST

Patent Literature

Patent Literature 1: WO 02/063300 A1
Patent Literature 2: JP 2003-294630 A
Patent Literature 3: JP 3822637 B1
Patent Literature 4: WO 06/062235 A1
Patent Literature 5: WO 07/029616 A1
Patent Literature 6: WO 12/105712 A1

SUMMARY OF THE INVENTION

Technical Problem

However, while in a case where the processing and measurement by the above-described ELISA method or the processing and measurement including extraction processing and amplification processing of DNA etc. are performed in units of wells using a microplate, parallel processing including position control by a dispensing apparatus, or the like, can be performed comparatively reliably including the measurement processing, this includes a problem, that is, because processing is performed for each of the wells, there are differences in solid phase between the wells, slight differences in concentration and amount of the solution between the wells, and in the encounter probability based on the difficulty in agitation operation of the solution within the well, or the like, making it difficult to execute processing under uniform conditions for each of the wells, leading to degradation in quantitativeness and uniformity.

On the other hand, in the case of using a probe array including DNA chips, a string-like carrier, or a plurality of particulate carriers being arranged instead of the microplate, it is possible to execute processing under uniform conditions for each of fixed positions due to uniformity of concentration and amount of solution between the fixed positions and high encounter probability based on the ease of agitation operation of the solution for each for the carriers, leading to achievement of high quantitativeness and uniformity. In the case of measuring an optical state of each of the fixed positions, however, the fixed position of each of the probe arrays involves uncertainty due to a slight deviation of the fixed position between the individual probe arrays, unlike the case of the positions of the container or the well, and this leads to difficulty in performing parallel measurement with high accuracy.

Therefore, in a case of performing scanning for each of the carriers to allow the light to be guided to each of the PMT, an increase in the number of probe arrays that perform parallel processing would also increase the number of expensive PMT, leading to an enlarged scale of the apparatus or high cost for various reasons. On the other hand, limiting the number of PMT would necessitate a mechanism for conveying and moving the carrier to the measurement position of the PMT, leading to a problem of enlargement of the apparatus scale.

Meanwhile, in a case of measuring by imaging the whole carrier such as a microplate or a DNA chip, an increase in the number of wells and the number of fixed positions on the carrier would decrease the size of each of the wells and the fixed position on the image, leading to a problem of difficulty in measuring the optical state at each of the wells or fixed position with high accuracy.

The present invention has been made to solve the above problems, and a first object is to provide a multiple reaction parallel measurement apparatus capable of performing test and information processing efficiently and quickly in a short time by collectively performing processing and measurement in a case where reactions on a plurality of, or particularly, a large number of reaction spots are performed in parallel, and a method therefor. A second object is to provide a multiple reaction parallel measurement apparatus capable of performing processing including reaction and measurement in a plurality of or particularly a large number of reaction spots with high quantitativeness and accuracy and uniform conditions, and a method therefor. A third object is to provide a multiple reaction parallel measurement apparatus capable of realizing processing including reaction and measurement in a plurality of or particularly a large number of reaction spots with a compact and inexpensive apparatus, and a method therefor.

Solution to Problem

According to a first aspect of the present invention, there is provided a multiple reaction parallel measurement apparatus including: a reaction spot array body constituted with a plurality of reaction spot array elements including two or more reaction spots on which reaction related to measurement takes place and arranged in a predetermined mode distinguishable from the outside; a plurality of light guiding paths provided corresponding to the reaction spot array element, including a measuring end configured to be able to be in proximity of or in contact with each one of the reaction spots, and arranged so as to be able to guide light obtained on the basis of an optical state that can be generated by a reaction at the reaction spot to a connecting end; a measurement head relatively movably arranged with respect to the array body such that the measuring ends of the plurality of light guiding paths sequentially reach all together predetermined measurement positions of the corresponding reaction spots of the respective reaction spot array elements at a predetermined scan period; a light guiding path selector configured to select the plurality of light guiding paths sequentially at a predetermined selection period during movement of each of the measuring ends to the predetermined measurement position by the measurement head or during stoppage at the position, and including a light guiding region optically connected to a connecting end of the selected light guiding path to enable emission of incident light; a light receiving unit configured to sequentially receive the light emitted from the light guiding region and photoelectrically convert the received light: a digital data converter configured to sequentially obtain digital data by converting, at the predetermined selection period, image region data obtained from the light receiving unit; and a storage unit configured to sequentially store the digital data.

Herein, the "reaction spot" is a place in which a reaction is performed and corresponds to, for example, a liquid storage unit storing or capable of storing various test solutions used in a reaction related to the test, or a fixed position on a test carrier to which various test substances used in the reaction related to the test are fixed. Note that the "test carrier" is a carrier configured to fix a plurality of types of test substances having a predetermined chemical structure at individual fixed positions arranged at predetermined intervals, on which each of the chemical structures and each of the fixed positions are associated with each other. The "reaction spot array element" is a region obtained by dividing the reaction spot array body so that at least one reaction spot is included in each of the divided array bodies, including the case of being formed separately and a case of being formed integrally. For example, the reaction spot array element includes cases of being one liquid storage unit (container) or a test carrier formed separately. "Contact" includes adhesion, bonding, or connection. The "liquid storage unit" also includes a temperature-controllable reaction container.

In a case where the reaction spot is the liquid storage unit, for example, the reaction spot array body includes a microplate including two-dimensionally arranged wells, being a plurality of liquid storage units, a cartridge container including one-dimensionally arranged well, or even includes a case where the microplates are three-dimensionally arranged by being stacked at intervals also in a height direction. Examples of the reaction spot array element include two or more liquid storage units, one or more cartridge containers, or one or more microplates.

In a case where the reaction spot is located on the test carrier, the reaction spot array body or the reaction spot array element may be referred to as a carrier, for example, having any of a rod shape, a needle shape, a strip shape, a string shape, a thread shape, and a tape shape, in which the fixed positions are one-dimensionally arranged, or as a carrier having any of a plate shape, a rod shape, a strip shape, a tape shape, and a string shape, in which the fixed positions are two-dimensionally arranged, and may further be considered as being three-dimensionally arranged in a case where the test carrier has a three-dimensional shape and the reaction spots are fixed on the surface of the three-dimensional carrier. Moreover, in a case where the test carrier is formed with a plurality of particulate carriers (particles), each of the particles corresponds to the fixed position. In this case, the reaction spots are arranged one-dimensionally.

Examples of the test substance include genetic substances such as nucleic acids having linking properties to a target chemical substance (including a biological substance) as a test target, biological substances such as proteins, sugars, sugar chains, peptides, or a solution thereof. In the test using these test substances, there are other substances or solutions related to the test, for example, those related to chemiluminescence. Examples of substances used for chemiluminescent reaction include 1) luminol or isoluminol derivative/hydrogen peroxide, 2) acridinium ester derivative/hydrogen peroxide, and 3) acridinium acylsulfonamide derivatives. This case includes a CLIA method of performing chemiluminescence detection using, as the triggering reagent, alkaline hydrogen peroxide for the acridinium derivative and using hydrogen peroxide and microperoxidase (m-POD) for the isoluminol derivative directly as labeling, and includes a CLEIA method of first labeling the enzyme and then performing chemiluminescence detection by measuring the activity of the labeling enzyme. Since enzymes are used for labeling, there is a need to achieve a method that suppresses deactivation of enzyme activity at the time of B/F separation. For example, in a case where horseradish peroxidase (HRP) is used as an enzyme, luminol/hydrogen peroxide is used as a substrate for detection. In another case where glucose oxidase is used as an enzyme, glucose/TCPO/ANS is used as a substrate. Measurement of glucose-6-phosphate dehydrogenase (G6PDH) can be detected by chemiluminescent reaction of NADPH since using glucose-6-phosphate as a substrate and NADP as a coenzyme generate NADPH by enzymatic reaction.

The "light receiving unit" refers to a sensor having one or more, or a large number of light receiving elements. An example of a highly sensitive light receiving element is an avalanche photodiode (APD) array manufactured by Hamamatsu Photonics K.K. As a special case where the array density of the light receiving elements is high, for example, an "imaging sensor" such as a CCD image sensor and a CMOS image sensor is included. For example, BITRAN BU-50 LM (ICX 415 AL) is a product of 6.4×4.8 mm, corresponding to 772×580 pixels. It is possible to obtain corresponding digital data by processing image region data (analog signal) obtained by light receiving elements included in the light receiving unit. These are formed with integrated circuits (IC). The "image region data" is a set of data obtained from the light receiving unit in consideration of the array of the light receiving elements. In a case where there is solely one light receiving element in the light receiving unit, the image region data corresponds to pixel data, and in a case where there is a plurality of light receiving elements or a large number of light receiving elements as described above (772×580 pixels) in the light receiving unit, the image region data corresponds to image data.

The "light receiving element" is an electronic element utilizing the photoelectric effect, examples of these including a photodiode and a phototransistor. Furthermore, the photodetector also includes a case of a photon counting sensor, or the like, having a multiplication effect like the APD.

The "predetermined measurement position" is a position provided so as to correspond to each of the reaction spots, at which the measuring end performs measurement related to the reaction spot. One or more predetermined measurement positions are set to be arranged for each of the reaction spots so as to come in proximity of or in contact with each of the reaction spots. Each of the reaction spots has a finite size and the measuring end also has a finite size, and it is preferable to have a size, a shape, or a predetermined measurement position capable of measuring the whole of solely one reaction spot. In a case where a plurality of the predetermined measurement positions is set, it is preferable to set the distance between the adjacent predetermined measurement positions to be equal, similarly to the distance between adjacent reaction spots. For example, in a case where the reaction spots are particulate carriers having a diameter of 1 mm arranged in a line, setting the predetermined measurement position every 0.1 mm means setting ten positions for one reaction spot. The more the number of the predetermined measurement positions, the more accurate measurement is possible, although the time taken for the measurement is extended.

The "predetermined scan period (ts)" is a time during which the measuring end moves between adjacent predetermined measurement positions in an identical reaction spot array element and the measurement is performed.

In contrast, the "predetermined selection period (tc)" is a time during which the light guiding path selector sequentially selects each of the light guiding paths so as to enable selection of all of the plurality of light guiding paths during the predetermined scan period (ts). Accordingly, the predetermined selection period (tc) and the predetermined scan period (ts) are associated with each other, and the longest and therefore the best predetermined selection period (tc) is determined to be tc=ts/n on the basis of the predetermined scan period (ts) and the number n of the reaction spot array elements. In other words, since the predetermined selection period is shorter than the predetermined scan period, it is preferable to set the longest length tc within a measurable time length in order to obtain a sufficient length of time that enables output of necessary image region data by performing photoelectric conversion of the light received by the light receiving unit during the predetermined selection period. Accordingly, it is preferable that all the light guiding paths are selected while the measuring end is moving to the next predetermined measurement position in a case where the measuring end continuously moves with respect to each of the reaction spot array elements, and it is preferable that all the light guiding paths are selected while the measuring end stops at the predetermined measurement position in a case where the measuring end intermittently moves to the predetermined measurement position.

The predetermined scan period and the predetermined selection period are determined in accordance with a light measurement mode constituted with one or more elements selected from a group including: optical state content to be measured; type of luminescence (for example, the type of fluorescent substance and the type of the chemiluminescent substance); reagent used for luminescence (including type of reagent and the amount of reagent; the number of measurement positions for one reaction spot, the mode of luminescence (for example, instantaneous light emission, light emission in plateau form, lifetime of light emission, stable light receivable time, etc.); movement mode from the measurement position to the next measurement position (intermittent operation, continuous operation, scan speed, moving distance, moving time, stopping time, moving path, etc. in a case where the measuring end scans between the reaction spots of the reaction spot array element); the size of the reaction spot, arrangement of the reaction spots or the number of reaction spots within reaction spot array element, etc.; the number of reaction spot array elements; the size of the light guiding path; the distance between the reaction spots; characteristics of the light receiving unit; the exposure time; and the reaction time in the reaction spot. Moreover, data transfer time or data readout time (in a case of using CCD) may be taken into consideration in some cases. For example, in a case where the amount of light is large as in the case of fluorescence, the predetermined scan period is set to be short; that is, the smaller the amount of light, the longer the predetermined scan period.

For example, in the case of plateau chemiluminescence, with stable light receiving time (T), the number of reaction spots (m) (m is a natural number) at which the plateau is maintained, the number of predetermined measurement positions per reaction spot (the number of times of light reception) (v) (v is a natural number), the predetermined scan period (ts) becomes $T/(m \cdot v)$. This period includes a moving time from the predetermined measurement position in each of the reaction spot array elements to the next predetermined measurement position, and a time for the digital conversion at the predetermined measurement position.

This results in selecting all the light guiding paths once as the longest "predetermined selection period (tc)", so as to be ts/n obtained by dividing the predetermined scan period (ts) by the number (n) of the light guiding paths, leading to selection of each of the light guiding paths at this period. Accordingly, in a case where the predetermined scan period is ts=T/(m·v), the predetermined selection period (tc) is T/(m·v·n), leading to selection of all the light guiding paths once at the predetermined selection period. Accordingly, the number of times of light reception for each of the reaction spots is v·n times. In a case where sufficient light receiving time can be obtained, it is preferable to perform selection for a plurality of times for each of the reaction spots.

More specifically, for example, in a case where there are sixteen (=n) reaction spot array elements as the reaction spot array body, and there are 50 (=m) particulate carriers as reaction spots are arranged in a straight line so as to come in contact with each other for one reaction spot array element, and in a case where each of the reaction spots is 1 mm, and in a case where five predetermined measurement positions are set for every 0.2 mm for each of the reaction spots (v=5), scanning is continuously performed, and when a light receiving stabilization time T is 200 seconds, the predetermined scan period (ts) is as follows: ts=200/(50×5) =0.8 seconds. This means that the predetermined selection period (tc) is: tc=ts/16=50 msec. There is a need to enable photoelectric conversion by reception of light by the light receiving unit within this time. This makes it possible to precisely and optically measure 800 reaction spots in total, that is, the number equivalent of about eight microplates including 8×12 wells, collectively in about three minutes.

In the case of a CCD image sensor, for example, the "digital data converter" may include a gate-controllable shift register, an amplifier, and an AD converter. In the case where the light receiving element is a PMT photon counting sensor that generates a number of photons corresponding to the intensity or luminance of the light received by the light receiving element or a photon counting sensor using a semiconductor, the "digital data converter" includes a gate-controllable pulse counter as a photon counter and is formed by an IC circuit similarly to the light receiving element array. These operate at a predetermined scan period obtained on the basis of the light measurement mode in accordance with an instruction from a measurement control unit to be described below.

The generated digital data is stored in a storage unit of a semiconductor storage element such as a DRAM, and then, a temporal change of the luminance of the optical state is derived and analyzed by computational processing on the basis of the digital data obtained by converting image region data of one or more light receiving elements corresponding to the light receiving unit at a predetermined selection period. The "predetermined selection period" is set, for example, on the basis of an instruction signal such as a pulse signal output on the basis of a drive unit that generates pulse signals at the period, or a measurement control unit provided in an information processing unit having a CPU, a program, and a memory.

The "light receiving unit" includes at least one light receiving element. In the case the light receiving unit includes at least three light receiving elements, it is possible to color imaging by light reception for each of the light receiving elements on the basis of the light received through color filters (RGB). The number and type of the light receiving elements depend on the size or sensitivity of the light receiving element, the size and shape of the connecting end of the light guiding path, the interval of the connection time, the interval between a second end (described below) and the light receiving surface, and the shape or the optical state mode of the second end.

The "digital data" is, for example, data representing numerical values that can be processed by an information processing apparatus such as a CPU. For example, in a case where there are many light receiving elements in the light receiving unit, the data can be stored in the storage unit by compression, thinning out of the image region data, or the like. The storage unit is a memory for recording data, and examples of this include a semiconductor memory, a hard disk, a CD, a DVD, an SSD, and a Blu-ray disc.

The "light guiding path" includes, for example, a cavity, an optical element such as a lens, and an optical fiber. An example of the optical fiber is a plastic optical fiber having an outer diameter of 500 μm, applicable for visible light. The optical fiber also includes an optical fiber bundle formed by bundling a plurality of optical fibers. It is preferable that at least a portion of the light guiding path is flexible. One end of the light guiding path is a measuring end and the other end is a connecting end.

The "optical state" includes luminescence of fluorescence or chemiluminescence, coloration, light change, discoloration. In a case where the optical state is "fluorescence", there may be a case of including a second light guiding path, that is, a light guiding path for emitting excitation light to the reaction spot, having an emitting end provided in proximity of or in contact with the one reaction spot of the reaction spot array body or provided so as to be able to come in proximity of or in contact with the one reaction spot of the reaction spot array body and having a connecting end provided in proximity of or in contact with a light emitting surface of a light source of the excitation light. In a case where the optical state is "coloration or discoloration", there may be a case of including a third light guiding path, that is, a light guiding path for emitting measurement light (e.g., light having a wavelength capable of obtaining reflected light or scattered light capable of detecting coloration or discoloration) to the reaction spot, and including an emitting end provided in proximity of or in contact with the one reaction spot of the reaction spot array body, or provided so as to be able to come in proximity of or in contact with the one reaction spot of the reaction spot array body and including a connecting end provided in proximity of or in contact with a light source surface of a light source of the measurement light. In these cases, it is preferable that the measuring end is bundled with the emission end with each of the distal ends being aligned with each other, and is handled as the measuring end.

The "light receiving surface" is a surface formed by an array of light receiving units of the light receiving element, in which the array is fine in the case of the image sensor and rough in the case of the ADP array. Note that the stored digital data is read out by the analysis unit of the information processing unit constituted with a CPU, or the like, computationally analyzed, to be tested for the target chemical substance.

A second aspect of the invention is a multiple reaction parallel measurement apparatus further including a light emitting unit capable of emitting predetermined light onto the light guiding region, in which the light guiding region of the light guiding path selector is capable of emitting the predetermined light that is incident, onto the connecting end of the selected light guiding path, and the light guiding path is capable of guiding the predetermined light incident on the connecting end to the measuring end.

Herein, examples of the "predetermined light" include excitation light for fluorescence and measurement light having various wavelengths with respect to coloration, discoloration, or the like. The predetermined light incident on the light guiding region passes through the selected light guiding path and is emitted to each of the reaction spots from the measuring end, and light generated on the basis of the predetermined light is received by the light receiving unit via the same selected light guiding path. The "light emitting unit" has a "light source". By using a wavelength variable light source such as an LED, a deuterium lamp (for example, Hamamatsu Photonics K.K. L10671D), and a halogen lamp as the light source, the light emitting unit is capable of emitting continuous wavelengths ranging from the ultraviolet region to the visible region to the sample.

A third aspect of the invention is a multiple reaction parallel measurement apparatus, in which the light guiding path selector further includes a light absorbing region capable of absorbing light from an unselected light guiding path other than the selected light guiding path, and the light absorbing region is arranged to optically connect to each of the connecting ends of the unselected light guiding path when the light guiding region is optically connected with the connecting end of the selected light guiding path.

Herein, the "light absorbing region" is a region capable of preventing or reducing light reflection and scattering by enabling light from the light guiding path to be absorbed. It is preferable that the light absorbing region is a region surrounded by a boundary line or a wall surface so as not to allow the light guiding region to exist, penetrate, or intersect, and is separated from the outside to have a light shielding property excluding a flat portion or an opening optically connected with the connecting end. For example, the light absorbing region is a planar region having a shape and an area so as to encompass the connecting end to which the black dye is applied, or a depression, a recess, a groove, a tube or a cavity including an opening having a shape and an area so as to encompass the connecting end, and formed to extend in a direction opposite to the connecting end. Note that a light shielding surface having a light shielding property is formed in a portion other than the connecting end of the connecting end arrangement plate. The planar region and the opening are not to be connected to the connecting end, or the portion other than the light shielding surface, on the connecting end arrangement plate. It is preferable that the wall surface in the depression, the recess, the groove, the tube, or the cavity is formed of a light shielding substance such as a metal and a resin, a black dye is applied, and a black fibrous substance such as carbonized cotton is formed inside.

A fourth aspect of the present invention is a multiple reaction parallel measurement apparatus, in which the light guiding path selector includes: a connecting end arrangement plate that arranges and supports each of the connecting ends of the plurality of light guiding paths at a predetermined center angle along a circumference; a rotating body for selection including the light guiding region and having a rotation axis concentric with the circumference of the connecting end arrangement plate; and a rotation drive mechanism capable of rotating the rotating body for selection continuously or intermittently at the predetermined selection period, the light guiding region at least includes a switching light guiding path having a first end provided sequentially, continuously or intermittently, optically connectably to the connecting end of each of the light guiding paths at the predetermined selection period and having a second end optically connected to the light receiving surface of the light receiving unit, the first end is arranged on a circumference concentric to and having a same diameter as the circumference of the connecting end arrangement plate on a first end arrangement surface defined so as to be in proximity of the connecting end arrangement plate in parallel, and the second end is arranged on a second end arrangement point defined on the rotation axis.

The light guiding path selector or the rotating body for selection is formed to be solid or hollow and has a housing for light-shielding the inside, and the switching light guiding path is provided inside the rotating body. In this case, the first end arrangement surface and the second end arrangement point are defined on an end surface or an endpoint through which the rotation axis of the rotating body for selection passes. For example, in a case where the rotating body is cylindrical and the rotation axis coincides with the center axis of the cylinder, they are defined on the bottom surface of the cylinder.

Regarding "arranges and supports each of the connecting ends at a predetermined center angle along a circumference", it is preferable that the cross section of each of the connecting ends is circular and the center of the circle is arranged at a predetermined center angle along the circumference. Regarding "the first end is arranged on a circumference concentric to and having a same diameter as the circumference of the connecting end arrangement plate", it is preferable that the cross section of the first end is circular and the center of the circle is arranged on the circumference. Moreover, regarding "the second end is arranged on a second end arrangement point defined on the rotation axis", it is preferable that the center of the second end is arranged on the second end arrangement point.

It is preferable that the connecting end and the first end have circular cross-sectional shapes, for example, and the size of the connecting end is preferably the size of the first end or less, because this enables all the light from the connecting end to be incident on the first end. It is preferable that the angle of the adjacent connecting end with respect to the center of the circumference, that is, the "center angle" is equiangular. In a case where there are n light guiding paths, the center angle is 360/n degrees.

The "switching light guiding path" is a light guiding path such as an optical fiber, and may either be flexible like a resin fiber and a thin fiber bundle, or be inflexible like a thick glass fiber. There is another case where the light guiding path includes an optical element such as a rod lens. In a case where it is inflexible, since the switching light guiding path is not deformed by a centrifugal force by the rotation of the rotating body for selection, the difference due to the influence of the rotation between each of the light guiding paths is considered to be small. It is preferable that an optical axis connecting the centers of the first end and the second end of the switching light guiding path along the light guiding path is included in one plane including the rotation axis of the rotating body for selection and extends along a smooth curved line from the periphery of the rotating body for selection to the rotation axis.

In a case where the predetermined selection period is the same, it is possible to increase the amount of light to be guided into the light receiving unit in a case of being optically connected intermittently, compared with a case where the connecting end and the first end are optically connected continuously with each other. The distance between the connecting end arrangement plate and the first end arrangement surface is 0.001 mm to 0.1 mm, for example, and preferably, 0.01 mm, for example. The diameter of the circle is 10 mm to 100 mm, for example, and preferably 50 mm, for example. The diameter of the connecting end is, for example, 1 mm to 3 mm, and the diameter of the switching light guiding path is 3 mm to 10 mm, for example, and preferably 4 mm, for example. Note that it is preferable that the connecting end arrangement plate and the rotating body for selection are formed so as to have a light shielding property in a portion other than the light guiding path, the switching light guiding path, the first end, the second end, or the connecting end. Note that the names "first end" and "second end" do not indicate the passing direction or the passing order of the light in a fixed manner, that is, the light is incident at the first end and is emitted at the second end in the case of light reception, and the light is incident at the second end and is emitted at the first end in the case of light emission. Accordingly, in the latter case, the second end is also optically connected to the light emitting surface of the light emitting unit.

A fifth aspect of the present invention is a multiple reaction parallel measurement apparatus, in which the measurement head further includes: a measuring end support body configured to support the plurality of measuring ends by an arrangement corresponding to an arrangement of the reaction spot array element; and a measuring end moving mechanism that enables the measuring end support body to move relative to the reaction spot array body and drives the measuring ends so as to reach all together the predetermined measurement position of the corresponding reaction spot of each of the reaction spot array elements at a predetermined scan period.

Note that since the "measuring end moving mechanism" can relatively move the measuring end support body with respect to the spot array body, there are cases where the measuring end support body is moved, where the reaction spot array body is moved, and where movement is performed in combination of these. Moreover, the measuring end support body reaches the predetermined measurement position set so as to be in proximity of or in contact with each of the corresponding reaction spots by moving the measuring end support body relative to the reaction spot array body, and thereafter, movement is further performed so as to sequentially scan between the predetermined measurement positions of the reaction spot to reach a next corresponding predetermined measurement position within each of the reaction spot array elements. In this case, the arrangement of the reaction spots between the reaction spot array elements is not necessarily congruent. For example, this includes a case where the arrangement of reaction spots in other reaction spot array element has a similar shape (the arrangement pattern is the same, but the magnification of the size is not one. In a case where the magnification is one, this corresponds to "congruence"), and a case of a reaction spot array element in which a portion of the reaction spot is not set at a corresponding position of the reaction spot array element. For example, in a reaction spot array element constituted with a plurality of particulate carriers, the case where the number of the particles, the size and the shape of the particles are identical and the modes of arrangement (for example, arranged in a single row, or the like, without a gap) are identical, the spot array is congruent, and the case where solely the size of the particle is not the magnification of one, the spot array has a similar shape. It is preferable that the "predetermined scan period" is determined in accordance with a moving speed of the measuring end by the measuring end moving mechanism that enables the measuring ends to reach all together each of the predetermined measurement positions set to be in proximity of or in contact with each of the reaction spots in each of the reaction spot array elements, the distance between the reaction spots, the number of predetermined measurement positions, the distance between the positions, or the like. Accordingly, the predetermined selection period for selection of the light guiding path of the light guiding path selector and for the conversion of the image region data into the digital data is determined on the basis of the predetermined scan period, the number (n) of the reaction spot array elements, or the like. Examples of the material of the particulate carrier include ceramics and resin.

A sixth aspect of the present invention is a multiple reaction parallel measurement apparatus, in which the rotating body for selection further includes a light absorbing region capable of absorbing light from an unselected light guiding path other than the selected light guiding path, and the light absorbing region is provided at least on a position opposing the connecting end of the light guiding path in the first end arrangement surface, along the circumference on the first end arrangement surface having the same diameter as and concentric to the circumference of the connecting end arrangement plate except for the first end of the switching light guiding path.

Here, in a case where the "light absorbing region" is, for example, a depression, a groove, a recess, a tube, or a cavity, the light absorbing region is formed to have an opening having a shape and an area so as to encompass the connecting end, provided so as to be optically connectable with each of the connecting ends of each of the unselected light guiding paths other than the selected light guiding path, and to have a predetermined depth to absorb the light incident from the opening while the light guiding region is optically connected to the connecting end of the selected light guiding path, and there are cases where: (n−1) openings are formed together with the first end to be arranged on the first end arrangement surface, along a circumference concentric to and having a same diameter as the circumference of the connecting end arrangement plate, corresponding to each of the connecting ends; one opening is formed, excluding the first end of the switching light guiding path, so as to be the opening covering, like a belt, a passage region formed by the rotation of the connecting end, along the circumference of first end arrangement surface, concentric with and having a same diameter as the circumference of the connecting end arrangement plate; and two to n−2 openings are formed in combination of arbitrary adjacent connecting ends, being the middle of the above-described two cases.

According to a seventh aspect of the present invention, it is preferable that each of the reaction spot array elements is configured to include two or more reaction spots being arranged in a mutually congruent manner, and the reaction spot array elements are preferably arranged so as to have mutually translational symmetry. In this case, the multiple reaction parallel measurement apparatus is an apparatus in which each of the measuring ends provided corresponding to each of the reaction spot array elements is arranged to be able to sequentially and all together come in proximity of or come into contact with the two or more reaction spots corresponding to each other among the reaction spot array elements.

The "translational symmetry" can be achieved to be in one axial direction, two axial directions, or three axial directions. By arranging the reaction spots so as to increase the number of axes, it is possible to achieve a compact shape of the apparatus. Moreover, by performing scanning in accordance with the arrangement of reaction spots belonging to one reaction spot array element, processing toward the corresponding other reaction spot array elements is performed automatically and simultaneously.

An eighth aspect of the present invention is a multiple reaction parallel measurement apparatus in which one of the reaction spot array body and the reaction spot array element includes one or more test carriers on which predetermined types of test substances are fixed on a plurality of mutually different reaction spots located at a predetermined position distinguishable from the outside.

An exemplary case of having one test carrier is a case where a test substance is arranged in one row or a plurality of rows on a rod-like carrier, a strip-like carrier, a string-like carrier, or the like. An exemplary case of having two or more test carriers is a case where a plurality of particulate carriers on each of which a test substance is fixed, is arranged in one row. In this case, it is preferable that the reaction spot is set in units of the particulate carrier.

Moreover, this includes a case where two or more reaction spots are provided in the reaction spot array element, the reaction spot has one liquid storage unit capable of storing a predetermined type of solution related to the test, and each of the measuring ends is provided in proximity of or in contact with a light guidable portion of the liquid storage unit.

The "light guidable portion of the liquid storage unit" is a portion capable of guiding an optical state inside the liquid storage unit to the outside, and includes, for example, an opening of the liquid storage unit, an entire wall surface of the liquid storage unit formed of a translucent material, translucent bottom or side surfaces, or a partial region thereof. The partial region is defined by the size, shape, or the position (including the distance from the liquid storage unit of the measuring end and the height) of the measuring end, the capacity of the liquid storage unit, the amount of liquid contained in the liquid storage unit, or the like. The "liquid storage unit" also includes a temperature-controllable "reaction container".

The predetermined selection period corresponds to ts/n obtained by dividing the predetermined scan period (ts) by the number of times of selection, that is, the number (n) of light guiding paths. The time needs to be at least longer than the minimum time enabling the light receiving unit to perform light reception, for example, longer than the accumulation time of the PMT. When it is assumed that the number of times of light reception performed during the movement between the adjacent reaction spots is v, the number of times of selection r is calculated as: r=v·n. This leads to the rotation speed of the rotating body for selection, that is, v times.

A ninth aspect of the invention is a multiple reaction parallel measurement apparatus further including a processing head including two or more dispensing elements provided corresponding to each of the reaction spot array elements and capable of suction and discharge of a liquid, in which the dispensing element is relatively movably arranged with respect to a storage unit group including a plurality of storage units being arranged corresponding to each of the reaction spot array elements, a distal end of the dispensing element is arranged to be insertable all together into each of the liquid storage units of each of the storage unit groups, and suction and discharge of the liquid stored in each of the storage units is performed toward the reaction spot array element by the dispensing element.

Herein, the "dispensing element" is an instrument capable of performing suction and discharge of a liquid. Examples of the dispensing element include a dispensing tip attached to a dispensing nozzle communicating with a gas suction and discharge mechanism provided in the processing head, and a deformable dispensing tip that can be deformed all together by a movable member provided on the processing head. The length of the dispensing element is about 3 cm to 25 cm, for example.

It is preferable that the processing head is relatively movably arranged with respect to a storage unit group region having at least the storage unit group including a plurality of liquid storage units containing a sample solution, various reagent solutions, and various cleaning solutions, for example. Moreover, in a case where the dispensing element is a dispensing tip, it is preferable that a tip storage unit for storing the dispensing tip that is detachably mounted is provided in the storage unit group region.

A tenth aspect of the present invention is a multiple reaction parallel measurement apparatus, in which the reaction spot array element is a test carrier and is enclosed in the dispensing element, suction and discharge of a liquid is performed toward the test carrier by the dispensing element, the test carrier is provided with each of fixed positions being distinguishable from the outside of the dispensing element, and the measuring end is arranged to be movable in proximity of or in contact with the dispensing element in accordance with the arrangement of the reaction spot by being arranged at least relatively movably with respect to the dispensing element.

Accordingly, the dispensing element needs to have translucency. By "enclosure", there is a need to provide an enclosure portion whereby the test carrier comes into contact with the liquid sucked by the dispensing element and the test carrier is held so as not to flow out of the dispensing element by discharge of the liquid of the dispensing element. Examples of the enclosure portion include a case of forming a step and a protrusion formed integrally with the dispensing element, and a case of forming separately as a fittable short pipe, a plate member having a through hole formed therein, and a filter, or a case of combining the both. In this case, for example, the measuring end moving mechanism may be provided in the storage unit group region instead of the processing head including the dispensing element, and the measuring end may be brought into contact with or in proximity of the dispensing element using the movement of the processing head, and thereafter, the measuring end may be moved in accordance with the arrangement of the reaction spot using the measuring end moving mechanism to come in proximity of each of the reaction spots. This makes it possible to simplify the structure of the measuring end moving mechanism. That is, it is sufficient to move the measuring end solely in the arrangement direction of the reaction spots of the reaction spot array element. This allow scanning to be performed in accordance with the arrangement of reaction spots belonging to one reaction spot array element, making it possible to allow the measuring end to be in contact with or in proximity of all other reaction spot array elements all together. It is preferable that the measuring end is positioned to be able to come in contact with or in proximity of the dispensing element at an end point of a moving path of the dispensing element within a storage unit group region including the storage region group, and so as to enable the distal end of the dispensing element to be inserted into the array end liquid storage unit arranged at the end of the storage unit group. It is preferable that the array end liquid storage unit is a temperature-controllable reaction container, capable of containing a substance related to luminescence. This makes it possible to smoothly, rationally and efficiently execute a series of processing ranging from extraction to measurement.

An eleventh aspect of the present invention is a multiple reaction parallel measurement apparatus, in which the measurement head is provided in the processing head, and arranged relatively movably at least in a horizontal direction with respect to the storage unit group together with the processing head.

Since the measurement head is provided "at least in a horizontal direction with respect to the storage unit group", it may be configured to be independently movable in a vertical direction with respect to the storage unit group. This makes it possible to perform measurement in a state where the distal end of the dispensing element is inserted into each of the storage units of the storage unit group. Moreover, the measurement head may be configured to be relatively movable in the horizontal direction with respect to the dispensing element. This makes it possible to allow the measuring end to be separated from the dispensing element when the dispensing element is attached or detached.

A twelfth aspect of the present invention is a multiple reaction parallel measurement method including: a reaction step of performing chemiluminescence-related reaction in a reaction spot of a reaction spot array body constituted with a plurality of reaction spot array elements having a plurality of reaction spots arranged in a predetermined mode distinguishable from the outside; a measurement step of allowing light based on an optical state generated by the reaction on each of the reaction spots all together to reach a predetermined measurement position of each of the corresponding reaction spots of each of the reaction spot array elements at a predetermined scan period by relatively moving each of the measuring ends of a plurality of light guiding paths provided corresponding to each of the reaction spot array elements with respect to the array body; a light guiding path selection step of selecting all the plurality of light guiding paths by allowing them to be optically connected with a light guiding region sequentially at a predetermined selection period while the measuring end moves to or stops at the predetermined measurement position of the reaction spot in each of the reaction spot array elements, and enabling the light from the measuring end of the selected light guiding path to be emitted to a light receiving surface of the light receiving unit via the light guiding region; a light receiving step of sequentially receiving the light emitted from the light guiding region and photoelectrically converting the received light by the light receiving unit; and a digital data conversion step of sequentially converting image region data obtained from the light receiving unit at the predetermined selection period into digital data and sequentially storing the converted digital data.

In a case where there is a light emitting unit capable of emitting the predetermined light, the light guiding path selection step may correspond to "a light guiding path selection step of selecting all the plurality of light guiding paths by allowing them to be optically connected with a light guiding region sequentially at a predetermined selection period while the measuring end moves to or stops at the predetermined measurement position of the reaction spot in each of the reaction spot array elements, and enabling predetermined light from the light emitting unit to be emitted via the light guiding region and enabling the light from the measuring end to be emitted to a light receiving surface of the light receiving unit via the light guiding region with respect to the measurement point of the selected light guiding path", and the light receiving step is to be replaced with "a light emitting/light receiving step in which the light emission unit sequentially emits predetermined light to the light guiding region, sequentially receiving the light emitted from the light guiding region and photoelectrically converting the received light by the light receiving unit".

A thirteenth aspect of the present invention is a multiple reaction parallel measurement method including a light absorption step of absorbing light from a light guiding path other than the selected light guiding path by a light absorbing region provided in proximity of a connecting end of an unselected light guiding path.

A fourteenth aspect of the invention is a multiple reaction parallel measurement method, in which the light guiding path selection step includes: continuously or intermittently rotating a rotating body for selection including a rotation axis passing through the light receiving surface of the light receiving unit and concentric with the circumference of the connecting end arrangement plate and including a switching light guiding path having a first end and a second end, at the predetermined selection period, with respect to the connecting end arrangement plate that supports each of the connecting ends of the plurality of light guiding paths by arranging them at a predetermined center angle along a circumference, thereby sequentially, continuously or intermittently, optically connecting the first end arranged on a circumference concentric to and having a same diameter as the circumference of the connecting end arrangement plate on the first end arrangement surface defined to come in proximity of the connecting end arrangement plate in parallel, to the connecting end of each of the light guiding paths, and thereby guiding the light from the connecting end optically connected to the first end from the second end arranged on a second end arrangement point defined on the rotation axis to the light receiving surface of the light receiving unit. In the case of light emission, the light is guided from the light emitting surface of the light emitting unit for the second end arranged on the second end arrangement point defined on the rotation axis to the connecting end optically connected to the first end.

A fifteenth aspect of the present invention is a multiple reaction parallel measurement method, in which the measurement step includes a measuring end moving step of allowing the measuring ends to reach all together the predetermined measurement positions of the corresponding reaction spot of each of the reaction spot array elements at the predetermined scan period by moving the measuring end support body in which the plurality of measuring ends is supported in arrangement corresponding to the arrangement of the reaction spot, relative to the reaction spot array body.

A sixteenth aspect of the present invention is a multiple reaction parallel measurement method, in which the reaction spot array element includes one test carrier in which a predetermined type of test substance related to the test is individually fixed on a plurality of reaction spots of the predetermined array distinguishable from the outside, and the reaction step performs reaction related to the test by dispensing a solution toward the test carrier.

A seventeenth aspect of the present invention is a multiple reaction parallel measurement method, in which each of the reaction spot array elements is enclosed in two or more translucent dispensing elements capable of suction and discharge of a liquid, the dispensing element is relatively movably arranged with respect to a storage unit group in which a liquid storage unit is arranged, a distal end of the dispensing element is arranged to be insertable all together into each of the liquid storage units of the storage unit group, and the reaction step performs reaction related to the measurement on the reaction spot array element by performing suction and discharge of the liquid stored in each of the liquid storage units by inserting the dispensing elements all together into each of the storage units. Herein, the "reaction spot array element" corresponds to one or more test carriers at predetermined positions distinguishable from the outside.

An eighteenth aspect of the invention is a light guiding path selection apparatus, being an apparatus configured to select a plurality of light guiding paths sequentially at a predetermine period and enable the light incident from the selected light guiding path to be sequentially emitted or enable the light to be sequentially emitted to the light guiding path, the light guiding path selection apparatus including: a connecting end arrangement plate for arranging and supporting each of connecting ends being one end of the plurality of light guiding paths at a predetermined center angle along a circumference; a rotating body for selection including a light guiding region configured to be sequentially optically connected with the connecting end of the plurality of light guiding paths and enable emission of incident light and having a rotation axis concentric with the circumference of the connecting end arrangement plate; and a rotation drive mechanism capable of continuously or intermittently performing rotational driving of the rotating body for selection at the predetermined period, in which the light guiding region includes a switching light guiding path having a first end arranged sequentially, continuously or intermittently, optically connectably to the connecting end of each of the light guiding paths at the predetermined period and having a second end provided at an end opposite to the first end, the first end is arranged on a circumference concentric to and having a same diameter as the circumference of the connecting end arrangement plate on a first end arrangement surface defined so as to be in proximity of the connecting end arrangement plate in parallel, and the second end is arranged on a second end arrangement point defined on the rotation axis. The first end and the second end are located on the optical axis through which the light passes.

The "predetermined period" is determined depending on the purpose of use of the light guiding path. An example of the purpose of use corresponds to a predetermined selection period as described above. An example of the "light guiding path" or the like is as described above. In a case where this apparatus is optically connected to a light receiving unit capable of photoelectric conversion at the second end, it is preferable to include a digital data converter configured to convert image region data obtained from the light receiving unit sequentially into digital data at the predetermined period and include a storage unit configured to sequentially store the digital data.

A nineteenth aspect of the invention is a light guiding path selection apparatus, in which the rotating body for selection further includes a light absorbing region capable of absorbing light from an unselected light guiding path other than the selected light guiding path, and the light absorbing region is arranged to optically connect to each of the connecting ends of the unselected light guiding path when the light guiding region is optically connected with the connecting end of the selected light guiding path.

Examples of the light absorbing region are as described above. An exemplary case is a case where the light absorbing region is provided so as to be in proximity of the connecting end of the other light guiding path, except for the connecting end of the light guiding path to which the first end of the switching light guiding path is in proximity, along the circumference on the first end arrangement surface concentric with and having a same diameter as the circumference of the connecting end arrangement plate.

Advantageous Effects of Invention

According to the first aspect of the invention or the twelfth aspect of the invention, by sequentially selecting a light guiding path provided for each of the reaction spot array elements so as to guide the light based on an optical state generated in each of the reaction spot array elements to one light receiving unit and performing light reception for a reaction spot array body in which a plurality of reaction spot array elements having a plurality of reaction spots is arranged, it is possible to perform analysis by converting multiple reactions performed all together at a large number of reaction spots into digital data using one light receiving unit. Accordingly, by performing light reception on one light receiving unit for each of the reaction array elements, which is further smaller in number than the number of reaction spots, it is possible to perform temporally and spatially integrated measurement of the spatial and temporal changes in the optical states of the plurality of reaction spots. This not merely enables suppression of enlargement of the scale of the apparatus but also enables highly reliable processing to be performed quickly and efficiently.

By performing switching between the reaction spot array elements with movement or scanning between the reaction spots within each of the reaction spot array elements, light reception with one light receiving unit is achieved, making it possible to reduce the number of expensive light receiving units, leading to supplying an inexpensive apparatus.

Processing and measurement between each of the reaction spot array elements can be independently performed in parallel, and thus, by physically separating the reaction spot array elements from each other or by shielding light between each of the reaction spot array elements, it is possible to eliminate an optical influence between adjacent reaction spot array elements and to perform processing and measurement with higher reliability and accuracy, and to perform processing and measurement more efficiently and quickly by simultaneous parallel processing, as compared with the case where the reaction spot is handled as the whole reaction spot array body.

The whole of a large number of reaction spots is treated as the reaction spot array body, divided into reaction spot array elements, predetermined measurement positions are set for the corresponding reaction spots belonging to each of the reaction spot array elements, and the measuring end is moved at a predetermined scan period. At the same time, the light guiding path corresponding to each of the reaction spot array elements is sequentially switched to be optically connected to one light receiving unit at a predetermined selection period associated with the predetermined scan period. With this configuration, processing from the scanning to conversion into the digital data is performed methodically using one light receiving unit even though the measurement is performed for a large number of reaction spots. Accordingly, the change of the number of reaction spot array elements and the number of reaction spots can be easily managed by changing the predetermined scan period and the predetermined selection period, leading to high flexibility and versatility.

According to the second aspect of the invention, it is possible to allow predetermined light from the light emitting unit to be incident on the light guiding region, and to allow the predetermined light to be emitted to the target reaction spot via the light guiding path and the measuring end selected for light reception. Accordingly, by emitting excitation light as predetermined light, it is possible to perform measurement using a fluorescent substance. This expands the scope of measurement and increases versatility, and together with this, eliminates the necessity of providing new light guiding paths used for emission onto the reaction spot, of a number corresponding to the number of reaction spot array elements, and necessity of providing new light guiding selector, making it possible to reduce the number of components and prevent enlargement of the scale of the apparatus.

According to the third aspect, the sixth aspect, or the thirteenth aspect of the invention, the selected light guiding path enables the light emitted from the connecting end to be reliably guided to the light receiving surface of the light receiving unit, while the unselected light guiding path enables not merely light shielding but also absorption of the light from the light guiding path. This makes it possible to reliably prevent noise light generated by reflection or scattering of the light from entering the light receiving unit, leading to achievement of measurement with high reliability.

According to the fourth aspect or the fourteenth aspect of the invention, the connecting ends of the plurality of light guiding paths are arranged along the circumference of the connecting end arrangement plate, and the rotating body for selection including a rotation axis concentric with the circumference and passing through the light receiving surface of one light receiving unit is rotated at a predetermined selection period. With this configuration, it is possible to guide the light from the connecting end of the light guiding path easily and reliably to the light receiving surface with a simple structure. This enables light reception to be methodically performed by one light receiving unit even though a large number of array spots are measured, making it possible to prevent enlargement of the apparatus scale against an increased number of reaction spots, and perform highly reliable processing and measurement with facilitated control.

Moreover, even in a case where there is a change in the number of reaction spot array elements and the number of reaction spots, by providing the changed reaction spot array body and the corresponding light guiding path, and changing to a connecting end arrangement plate corresponding to the changed reaction spot array element, it is possible to easily manage the situation just by changing on data of the new predetermined scan period and the new predetermined selection period. This makes it possible to achieve an apparatus configuration having flexibility and versatility, and efficient processing and measurement using one light receiving unit.

According to the fifth aspect or the fifteenth aspect of the invention, it would be sufficient to provide a light guiding path for each of the reaction spot array elements each having two or more reaction spots, and to provide one light receiving unit, making it possible to reduce the number of light guiding paths and the number of the light receiving elements, leading to prevention of enlargement of the apparatus scale and reduction of the manufacturing cost of the apparatus. Moreover, by enabling the measuring end provided corresponding to each of the reaction spot array elements to move all together among the reaction spots in the reaction spot array element, it is possible to suppress enlargement of the scale of the apparatus because there is no need to independently provide a moving mechanism for each of the reaction spot array elements. Moreover, by converting the spatial change of each of the reaction spots arranged in each of the reaction spot array elements into temporal change by changing the data to digital data for every predetermined selection period, it is possible to simplify and visualize the processing, leading to achievement of highly reliable processing.

According to the seventh aspect of the invention, the reaction spot array body has two or more reaction spot array elements arranged in a mutually congruent manner, and each of the reaction spot array elements is arranged so as to have mutual translational symmetry, and in addition, the measuring end support body is provided such that each of the measuring ends provided corresponding to each of the reaction spot array elements is sequentially brought in proximity of or in contact with the corresponding reaction spots all together. This makes it possible to use, toward a large number of reaction spots, comparatively a small number of light guiding paths and light receiving regions to achieve execution of tests efficiently and quickly with a simple control in such a manner as to perform processing toward one reaction spot array element without enlarging the apparatus scale and increasing the number of processing steps.

Furthermore, by arranging the reaction spot array elements dispersely in such a way to have translational symmetry in one axial direction, two axial directions, or three axial directions in accordance with an increase in the number of reaction spot array elements, it is possible to achieve the apparatus scale as a whole with an orderly and compact shape. Moreover, by simplifying or uniformizing the shape of the measuring end support body and the arrangement of the measuring end to simplify the apparatus structure, and using comparatively a small number of light guiding paths and using the light receiving region with a simple shape and arrangement for a large number reaction spots, it is possible to suppress enlargement of the apparatus scale and the increase in the number of processing steps, leading to achievement of efficient and prompt execution of the measurement spatially and temporally with a simplified control in such a manner as to perform processing toward one reaction spot array element.

According to the eighth aspect or the sixteenth aspect of the invention, the reaction spot array body or the reaction spot array element is a test carrier, enabling each of the reaction spots to be integrated in arrangement, making it possible, in handling a large number of reaction spots, to save the working space and prevent enlargement of the apparatus scale, and to form a compact and efficient apparatus.

According to the ninth aspect of the present invention, there is provided a processing head including two or more dispensing elements capable of suction and discharge of a liquid and having a distal end being insertable into each of the liquid storage units of the planar liquid storage unit groups all together, being arranged relatively movably with respect to the planar liquid storage body, thereby performing suction and discharge of the liquid contained in each of the liquid storage units by the dispensing element toward the reaction spot array element. With this configuration, it is possible to consistently perform the processing from the reaction to the measurement and furthermore, from the extraction to the measurement, using a single apparatus, and thus, possible to set an optimized timing of the optical state measurement from the reaction stage.

According to the tenth aspect or the seventeenth aspect of the invention, the reaction spot array element is a test carrier and enclosed in the dispensing element, for example. Accordingly, it is possible to perform suction and discharge of a liquid with the dispensing element all together for each of the reaction spots, and in addition to this, since the individual test carriers are reliably separated from each other, it is possible to reliably prevent cross contamination and to achieve highly reliable execution of the test. Moreover, it is possible to execute processing from the reaction to the measurement consistently by one apparatus, and furthermore, using the dispensing element in which no test carrier is enclosed, it is possible to consistently perform processing from extraction to the measurement by one apparatus.

According to the eleventh aspect of the invention, by providing the measurement head in the processing head, there is no need to independently provide at least a moving mechanism in the horizontal direction with respect to the storage unit group, making it possible to prevent enlargement of the apparatus scale. Furthermore, it is possible to use the processing head also for the vertical moving mechanism with respect to the storage unit group. Moreover, it is possible to use the moving mechanism for the dispensing element with respect to the processing head for the scanning of the measuring end with respect to the array body.

According to the eighteenth aspect of the present invention, by sequentially performing selective guiding toward the plurality of light guiding paths at predetermined periods, it is possible to use a set of optical components such as a light receiving unit without a need to provide an optical system components such as a light receiving unit or a light emitting unit for each of the light guiding paths, leading to reduction of the cost by reducing the number of optical system components including the light receiving unit regardless of the number of light guiding paths.

According to the nineteenth aspect of the present invention, by enabling the light absorbing region to be optically connected to the connecting end of the unselected light guiding path, it is possible to absorb the light from the unselected light guiding path and to prevent noise light generated by reflected or scattered light from entering the light receiving unit and optical system components, leading to achievement of highly reliable selection of the light guiding path.

DESCRIPTION OF EMBODIMENTS

Next, multiple reaction parallel measurement apparatuses 10 and 11 according to a first embodiment of the present invention will be described with reference to FIGS. 1 to 7.

Figure 1:
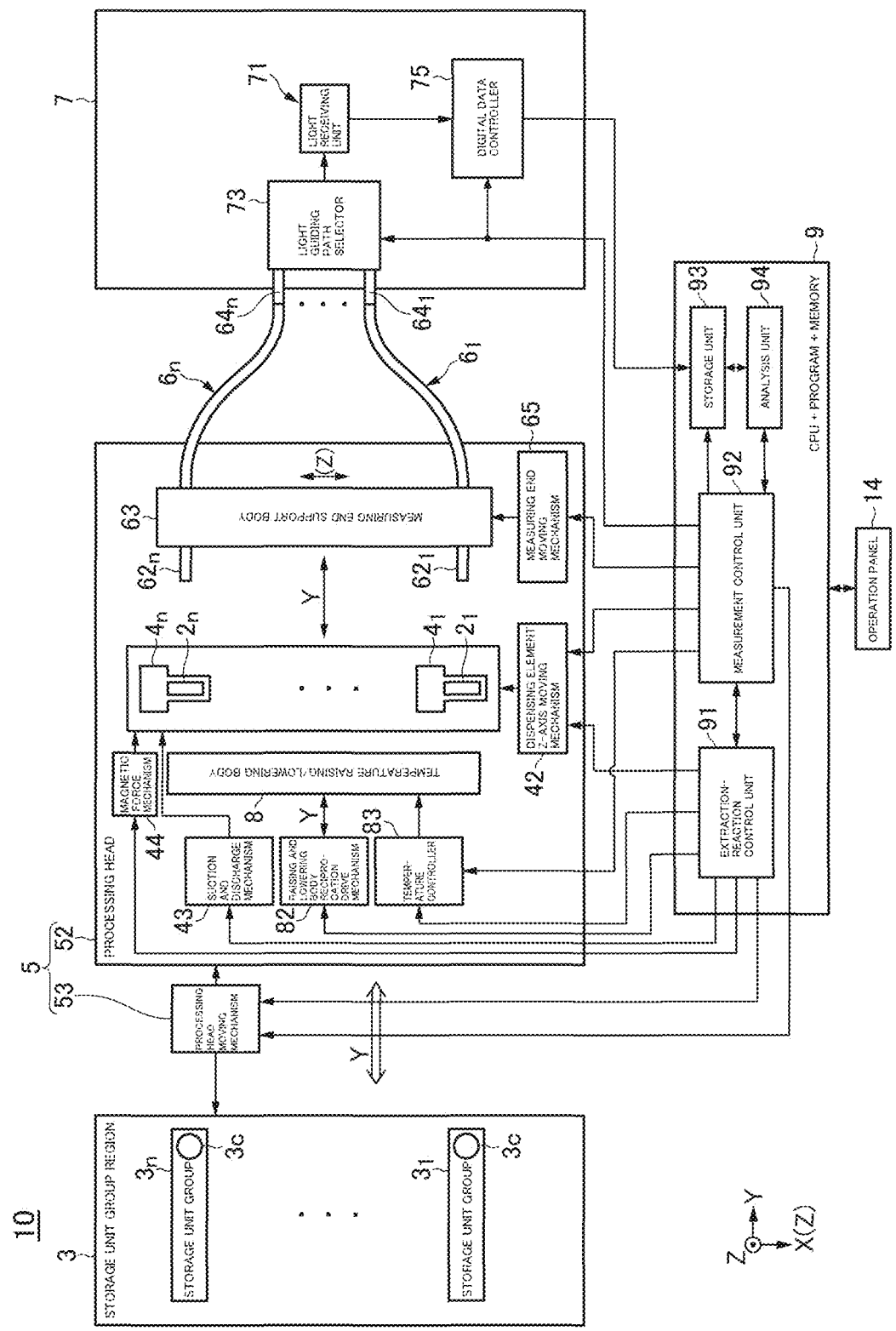
FIG. 1 is a block diagram illustrating a multiple reaction parallel measurement apparatus according to a first embodiment of the present invention.

FIG. 1 is a block diagram illustrating the multiple reaction parallel measurement apparatus 10 according to the first embodiment.

Roughly, the multiple reaction parallel measurement apparatus 10 includes: a storage unit group region 3, an array body processing apparatus 5, a plurality of (n) reaction spot array elements $2_1$ to $2_n$, a light receiving processing unit 7, a CPU+program+memory 9 and an operation panel 14. The storage unit group region 3 includes storage unit groups $3_1$ to $3_n$ arranged in n rows on a stage in the Y-axis direction ("n" corresponds to the number of reaction spot array elements to be described below), that is, a plurality of storage units each containing various types of solution and various dispensing tips. The array body processing apparatus 5 includes a processing head 52 and a processing head moving mechanism 53. The processing head 52 is provided in a horizontal direction with respect to the storage unit group region 3, for example, relatively movably provided in the Y-axis direction, and includes dispensing tips $4_1$ to $4_n$ having translucency and provided corresponding to a plurality of (n in this example) dispensing elements being arranged to enable the distal end to be inserted into each of the storage units. The processing head moving mechanism 53 enables relative movement between the processing head 52 and the storage unit group region 3 at least in the Y-axis direction. The plurality of (n) reaction spot array elements $2_1$ to $2_n$ forms a reaction spot array body 2, the reaction spot array elements $2_1$ to $2_n$ including a plurality of reaction spots enclosed in thin tubes of the dispensing tips $4_1$ to $4_n$, on which reaction related to measurement takes place and provided at mutually different positions distinguishable from the outside. The light receiving processing unit 7 performs light receiving processing on the light guided from the reaction spot array body 2 by the light guiding paths $6_1$ to $6_n$. The CPU+program+memory 9 functions as an information processing unit configured to perform information processing for various control. The operation panel 14 allows a user to operate including giving an instruction toward the CPU+program+memory 9.

The processing head 52 includes n light guiding paths $6_1$ to $6_n$ and measurement heads ($62_1$ to $62_n$, 63, and 65). The light guiding paths $6_1$ to $6_n$ includes n measuring ends $62_1$ to $62_n$ arranged to be able to come in proximity of or in contact with the thin tubes of the n dispensing tips $4_1$ to $4_n$, that is, arranged to be able to come in proximity of each of the enclosed reaction spot array elements $2_1$ to $2_n$. The light guiding paths $6_1$ to $6_n$ each guide the light obtained on the basis of the optical state generated by the reaction on the reaction spot to connecting ends $64_1$ to $64_n$. The measurement heads ($62_1$ to $62_n$, 63, and 65) are arranged movably relative to the array body such that the measuring ends $62_1$ to $62_n$ of the plurality of light guiding paths $6_1$ to $6_n$ reach all together predetermined measurement positions of the corresponding reaction spots of the reaction spot array elements $2_1$ to $2_n$ at a predetermined scan period (ts).

The light receiving processing unit 7 includes a light guiding path selector 73, a light receiving unit 71, and a digital data converter 75. The light guiding path selector 73 sequentially selects the plurality of light guiding paths at a predetermined selection period (tc) during movement of each of the measuring ends $62_1$ to $62_n$ by the measurement heads ($62_1$ to $62_n$, 63, and 65) to the predetermined measurement position or during stoppage at the position, and includes a light guiding region optically connected to the connecting ends $64_1$ to $64_n$ of the selected light guiding paths $6_1$ to $6_n$ to enable emission of incident light. The light receiving unit 71 sequentially receives light emitted from the light guiding region of the light guiding path selector 73 and photoelectrically converts the received light. The digital data converter 75 sequentially obtains digital data by converting image region data obtained from the light receiving unit 71 at the predetermined selection period.

The measurement head includes a measuring end support body 63 and a measuring end moving mechanism 65. The measuring end support body 63 supports the plurality of measuring ends $62_1$ to $62_n$ by arranging them at intervals corresponding to the arrangement of the reaction spot array elements $2_1$ to $2_n$. The measuring end moving mechanism 65 enables the measuring end support body 63 to come close to or be separated from the dispensing tips $4_1$ to $4_n$ by movement in the Y-axis direction and enables the measuring ends $62_1$ to $62_n$ to move in the Z-axis direction so as to be sequentially brought in proximity of each of the reaction spots 21 of the enclosed reaction spot array elements $2_1$ to $2_n$ all together. The measuring ends $62_1$ to $62_n$ are arranged at ends corresponding to the end points of the moving path of the dispensing element among the storage unit groups $3_1$ to $3_n$ and are preferably arranged at positions corresponding to an array end liquid storage unit 3c into which the distal ends of the dispensing tips $4_1$ to $4_n$ are insertable at the same position, that is, the position enabling the movement to come close to or be separated from the dispensing tips $4_1$ to $4_n$ by the measuring end moving mechanism 65 in a case where the dispensing tips $4_1$ to $4_n$ are arranged at the positions. Alternatively, in a case where the storage unit group region 3 moves in the Y-axis direction and the dispensing tips $4_1$ to $4_n$ are immovable in the Y-axis direction, the measuring ends $62_1$ to $62_n$ are preferably arranged at the position enabling the movement to come close to or be separated from the dispensing tips $4_1$ to $4_n$ by the measuring end moving mechanism 65.

Each of the reaction spot array elements $2_1$ to $2_n$ is a test carrier. The reaction spot array elements $2_1$ to $2_n$ include a plurality of particles having the same shape (the same number in each of the reaction spot array element) and arranged in a line in the Z-axis direction within the thin tube, to be described below. Each of the particles corresponds to a reaction spot to which a predetermined test substance is fixed. This allows two or more of the reaction spots to be arranged in a mutually congruent manner, with each of the reaction spots of these reaction spot array elements having translational symmetry with respect to each other in the X-axis direction and the Z-axis direction. The diameter of the particles is, for example, from 0.5 mm to 10 mm, preferably 1 mm, for example.

The processing head 52 of the multiple reaction parallel measurement apparatus 10 further includes a suction and discharge mechanism 43 configured to perform suction and discharge of a liquid on the dispensing tips $4_1$ to $4_n$ which are the dispensing elements. The dispensing tips $4_1$ to $4_n$ are arranged and supported at a dispensing tip support member at intervals corresponding to the arrangement of the storage unit groups $3_1$ to $3_n$ in the X-axis direction. For example, each of nozzles communicating with the suction and discharge mechanism 43 is arranged at the dispensing tip support member, and the dispensing tips $4_1$ to $4_n$ are mounted on and supported by a lower end portion of the nozzle. The suction and discharge mechanism 43 includes a detachable mechanism for detaching the dispensing tip from the nozzle.

Moreover, the processing head 52 includes: a dispensing element Z-axis moving mechanism 42 for moving the dispensing tips $4_1$ to $4_n$ all together in the Z-axis direction; a temperature raising and lowering body 8 for controlling the temperature of thin tube in which the reaction spot array elements of the dispensing tips $4_1$ to $4_n$ are enclosed; an raising and lowering body reciprocation drive mechanism 82 for advancing or retracting the temperature raising and lowering body 8 in order to bring the temperature raising and lowering body 8 in proximity of or in contact with each of the dispensing tips; a temperature controller 83 for controlling the raising and lowering of the temperature of the temperature raising and lowering body 8; and a magnetic force mechanism 44 for applying a magnetic force to the inside of the dispensing tip.

The CPU+program+memory 9 includes an extraction-reaction control unit 91, a measurement control unit 92, a storage unit 93, and an analysis unit 94. The extraction-reaction control unit 91 gives an instruction of extraction or reaction to each of the temperature controller 83, the raising and lowering body reciprocation drive mechanism 82, the suction and discharge mechanism 43, the dispensing element Z-axis moving mechanism 42, the magnetic force mechanism 44, and the processing head moving mechanism 53. The measurement control unit 92 gives a measurement instruction to each of the measuring end moving mechanism 65, the dispensing element Z-axis moving mechanism 42, the light receiving unit 71, the light guiding path selector 73, the digital data converter 75, the storage unit 93, and the analysis unit 94. The storage unit 93 stores, sequentially in accordance with the spot array element, digital data obtained from converting the image region data from the light receiving unit 71 at the predetermined selection period set by the pulse signal based on the measurement control unit 92. The analysis unit 94 analyzes the measurement by performing computation on the basis the digital data stored in the storage unit 93.

Subsequently, the multiple reaction parallel measurement apparatus 11, a more specific version of the multiple reaction parallel measurement apparatus 10 according to the embodiment of the present invention described with FIG. 1, will be described with reference to FIGS. 2 to 6.

Figure 2:
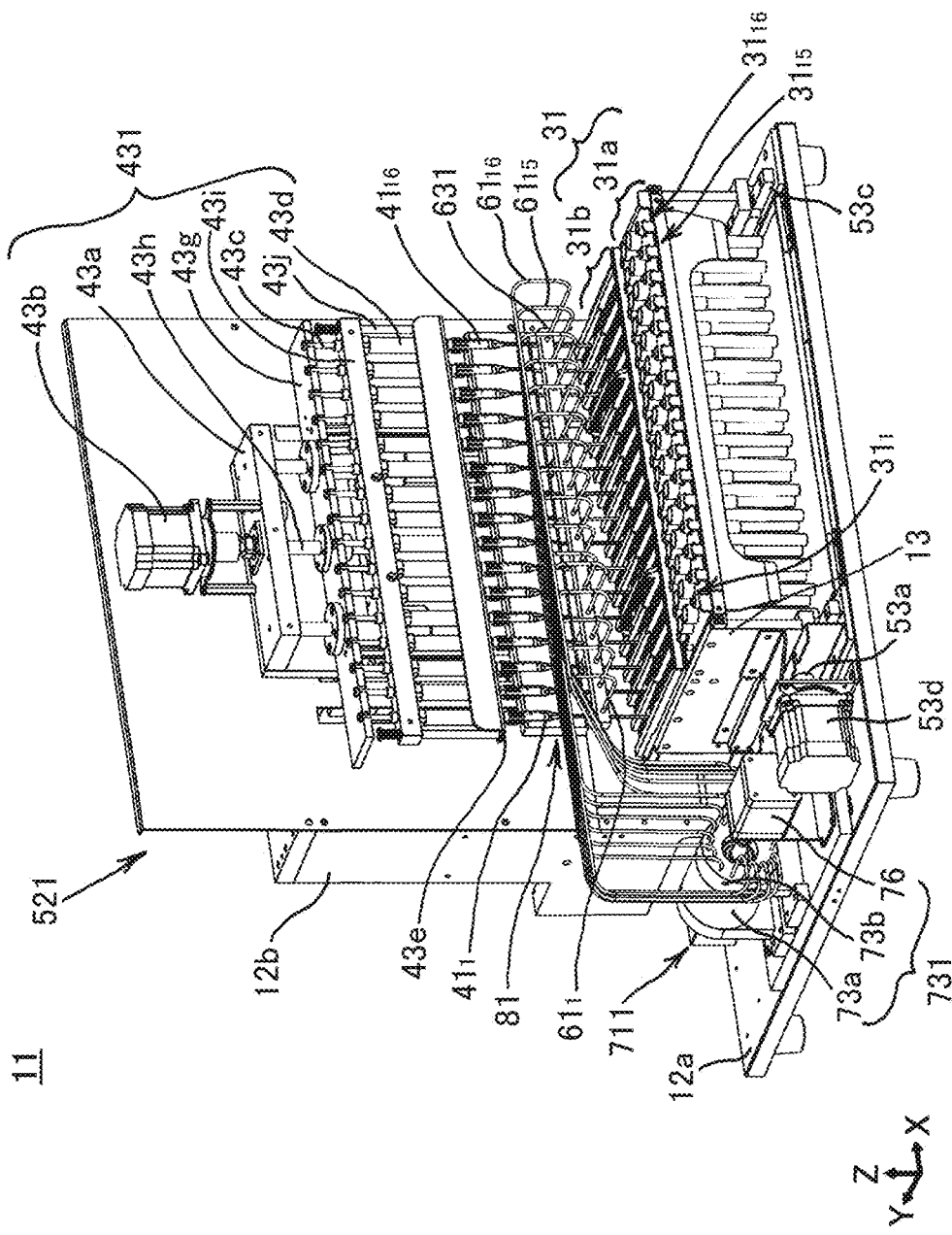
FIG. 2 is a perspective view more specifically illustrating the multiple reaction parallel measurement apparatus illustrated in FIG. 1.
Figure 3:
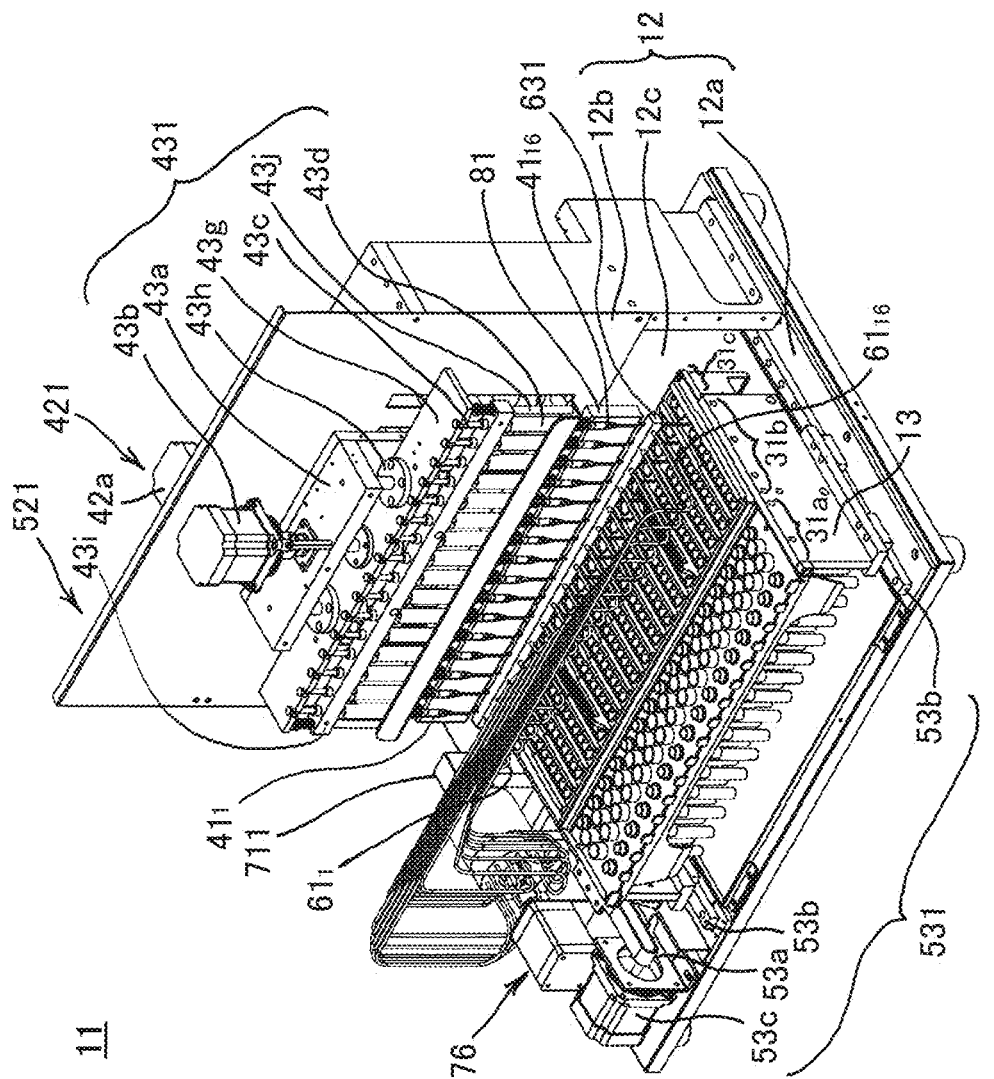
FIG. 3 is a perspective view of the multiple reaction parallel measurement apparatus illustrated in FIG. 2 as viewed from another direction.
Figure 4:
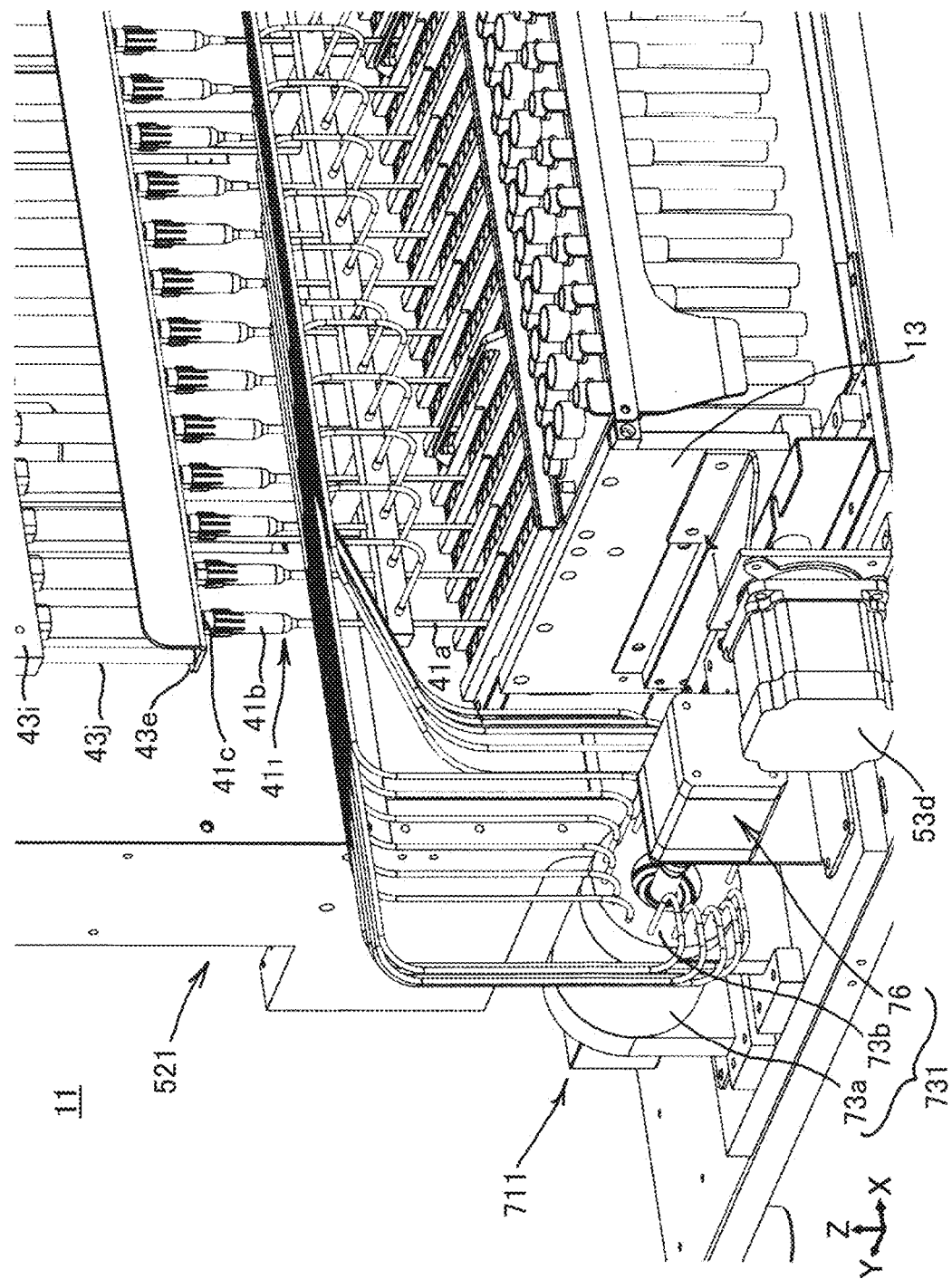
FIG. 4 is a partially enlarged perspective view of the multiple reaction parallel measurement apparatus illustrated in FIG. 2.

While, as illustrated in FIGS. 2 and 3, the multiple reaction parallel measurement apparatus 11 illustrates solely an internal mechanism by omitting the housing 12 for the sake of explanation, various mechanisms are incorporated in the housing 12 having a dark box function capable of shielding entrance of external light. The housing 12 has a bottom 12a and a wall 12b having a gap 12c through which a stage 13 described below can pass. A touch tablet functioning as the operation panel 14 is detachably attached on the outside on the housing 12.

As illustrated in FIGS. 2 and 3, storage unit group regions $31_1$ to $31_{16}$ are provided on the stage 13 having a height corresponding to a maximum depth of the container with respect to the bottom 12a of the housing 12. In the storage unit group region 31, storage unit groups $31_1$ to $31_{16}$ (in the case of n=16 in FIG. 1) having a cartridge-like container extending in the Y-axis direction are arranged in a plurality of rows (in this example, 16 rows) in the X-axis direction. Each of the storage unit groups $31_1$ to $31_{16}$ includes a tip storage unit group 31a, a liquid storage unit group 31b, and a cartridge container having a reaction container 31c. The tip storage unit group 31a stores or is capable of storing a dispensing tip constituted with a thin tube 41a and a thick tube 41b (refer to FIGS. 4 and 5) in a state where an attachment opening 41c provided in the thick tube 41b is positioned on the upper side. The liquid storage unit group 31b stores specimen solution and various reagent solutions. The reaction container 31c stores a reagent solution necessary for the measurement and functions as the array end liquid storage unit provided at the end of the container, being temperature controllable. The contents stored in each of these storage units are stored in the order of processing in the Y-axis direction being the moving path of dispensing tips $41_1$ to $41_{16}$.

As the processing head moving mechanism 53 for moving a processing head 521 of the array body processing apparatus 5 in the Y-axis direction relative to the storage unit group region 31, further provided is a stage moving mechanism 531 configured to, for example, move the storage unit group region 31 together with the stage 13 in the Y-axis direction with respect to the processing head 521 in a stationary state. The stage moving mechanism 531 includes a timing belt 53a wound around two pulleys connected with the stage 13 and arranged in the Y-axis direction, a motor 53c for rotationally driving the pulley, and includes a guide rail 53b installed at the bottom 12a of the housing and on which a leg of the stage 13 is slidably supported.

The entire processing head 521 is supported on the wall 12b of the housing 12 so as to be movable in the Z-axis direction. The processing head 521 includes a dispensing element Z-axis moving mechanism 421 provided so as to allow each of the dispensing tips $41_1$ to $41_{16}$ to move in the Z-axis direction by being connected to a nut portion screwed to a ball screw provided in the Z-axis direction and a timing belt.

The dispensing element Z-axis moving mechanism 421 includes: a motor 42a attached to the back side of the wall 12b; an upper pulley rotatably driven by the motor 42a; a lower pulley provided on the lower side in the Z-axis direction below the upper pulley; a timing belt wound around the two pulleys; a connecting tool connected to the timing belt through the wall and is movable in the vertical direction; and a Z-axis moving body 43a arranged on the front side of the wall 12b.

The processing head 521 further includes a suction and discharge mechanism 431 for performing suction and discharge of a liquid toward the dispensing tips $41_1$ to $41_{16}$ as the dispensing elements. The suction and discharge mechanism 431 includes a Z-axis moving body 43a, a motor 43b, a piston rod driving plate 43g, sixteen piston rods 43c, a cylinder support member 43i, and a tip detaching plate 43e. The Z-axis moving body 43a is provided to be movable in the Z-axis direction in connection with a connecting tool driven by the timing belt of the dispensing element Z-axis moving mechanism 421. The motor 43b is mounted on the upper side of the Z-axis moving body 43a. The piston rod driving plate 43g is connected to a nut portion screwed with a ball screw 43h rotationally driven by the motor 43b and moves vertically. The sixteen piston rods 43c slidably move within a cylinder 43d in the Z-axis direction all together by the driving plate 43g. The cylinder support member 43i is a member supported by the Z-axis moving body 43a and to which the cylinder 43d is attached. The cylinder support member 43i supports sixteen nozzles provided at the lower end of the cylinder 43d. The tip detaching plate 43e includes a through-hole having a size that allows penetration of a nozzle protruding below the cylinder 43d after attachment of the cylinder 43d and having a size that prohibits penetration of the dispensing tip $41_1$ to $41_{16}$. The tip detaching plate 43e is supported by the piston rod driving plate 43g and is provided so as to be movable in a lower direction by pressing a detaching bar 43j by a downward movement of the piston rod driving plate 43g by a distance exceeding a predetermined distance. The lower end of the detaching bar 43j is attached to the tip detaching plate 43e and is supported in a state of being elastically biased upwardly from the cylinder support member 43i on the upper side thereof, and its upper end is located at a position separated from the piston rod driving plate 43g by the predetermined distance.

The sixteen dispensing tips $41_1$ to $41_{16}$ are attached by allowing their attachment openings to be fitted to the sixteen nozzles protruding downward at the lower end of the cylinder 43d. Accordingly, the dispensing tip can move vertically with respect to the processing head 521 in the Z-axis direction together with the Z-axis moving body 43a, and the distal end thereof can be inserted into the liquid storage unit provided in the storage unit group region 31, enabling suction and discharge of the liquid by the suction and discharge mechanism 431. This enables the particulate carrier as a plurality of (50 in this example) reaction spots 22 constituting each of the reaction spot array elements $21_1$ to $21_{16}$ enclosed in the dispensing tips $41_1$ to $41_{16}$ to come in contact with the liquid (refer to FIG. 5).

Figure 5:
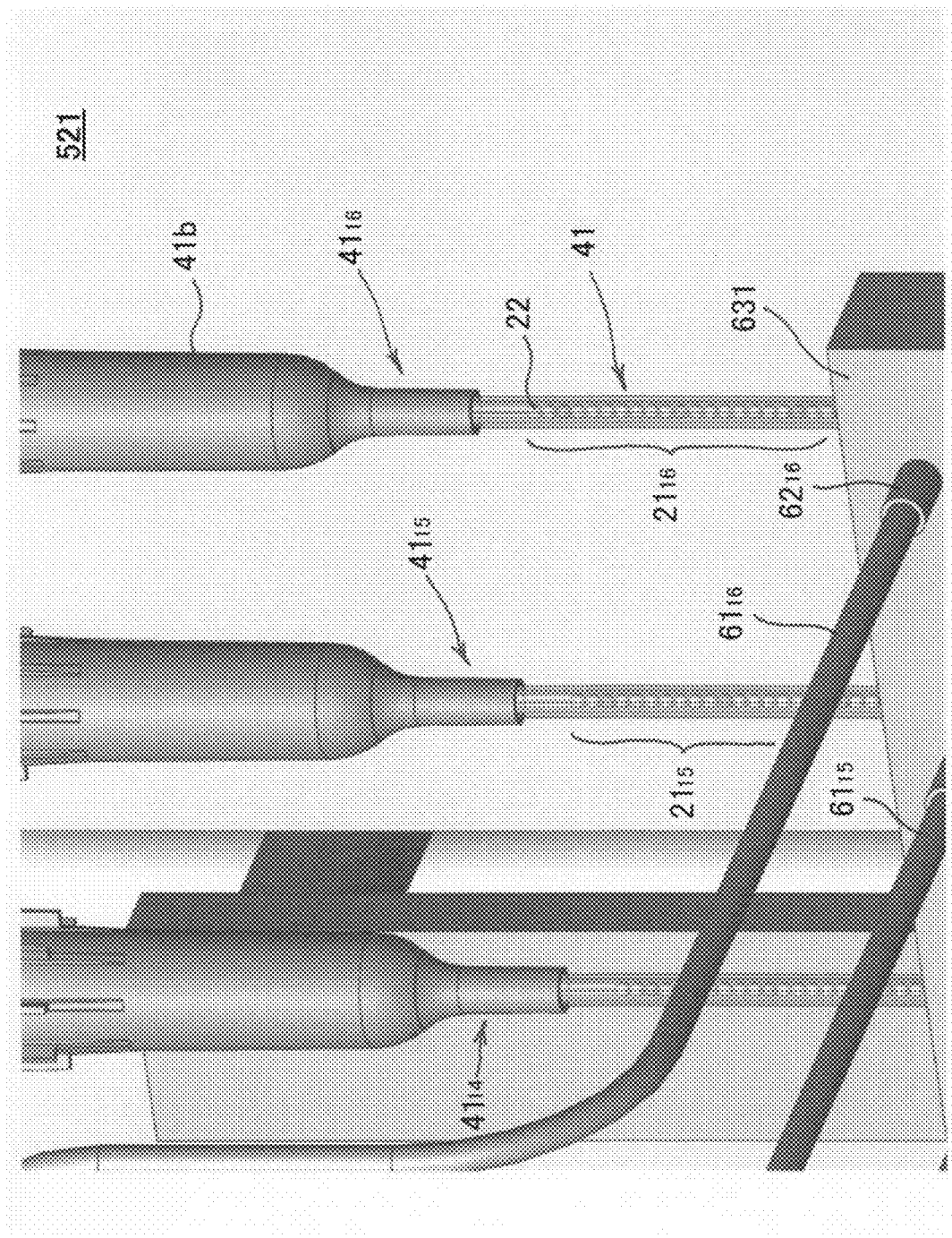
FIG. 5 is a partially enlarged perspective view of the multiple reaction parallel measurement apparatus illustrated in FIG. 4 as viewed from a lower direction.

As illustrated in FIG. 5, in a thin tube 41a of the dispensing tips $41_1$ to $41_{16}$ constituted with the thin tube 41a and the thick tube 41b communicating with the thin tube 41a and having the attachment opening detachably attached to the nozzle, a plurality of (16 in this example) reaction spot array elements $21_1$ to $21_{16}$ constituting a reaction spot array body 21 is arranged with translational symmetry with respect to each other in the X-axis direction. Each of the reaction spot array elements $21_1$ to $21_{16}$ encloses a plurality (50 in this example) of particles as the reaction spots 22 on which reaction related to measurement takes place and provided at mutually different predetermined positions distinguishable from the outside, being arranged in a line in a mutually congruent manner in the Z-axis direction. This means that the reaction spots 22 are arranged in a similar manner with translational symmetry in the Z-axis direction. That is, according to the multiple reaction parallel measurement apparatus 11 according to the present embodiment, the reaction spots 22 are arranged with translational symmetry in the two axial directions, the X-axis direction and the Z-axis direction. This indicates that the reaction spot array elements $21_1$ to $21_{16}$ are arranged with translational symmetry in the X-axis direction.

Returning to FIG. 2 or FIG. 3, the storage unit group region 31 further includes a light receiving unit 711, and includes as a light guiding path selector 731, a connecting end arrangement plate 73b, a rotating body for selection 73a, and a motor 76a, on the bottom 12a of the housing 12 on the lower side of the stage 13. The connecting end arrangement plate 73b supports the connecting ends of plurality of (16 in this example) light guiding paths $61_1$ to $61_{16}$ arranged equiangularly at a predetermined center angle, 22.5 degrees in this example along the circumference. The rotating body for selection 73a is incorporated in a dark box to include the light guiding region and provided so as to have a rotation axis coaxial with the circumference of the connecting end arrangement plate 73b. The motor 76a functions as a rotation drive mechanism 76 capable of rotational driving of the rotating body for selection continuously or intermittently at the predetermined selection period.

A case where a CCD image sensor is used as the light receiving unit 711 will be described. An example of the CCD image sensor is one including a light receiving surface of 6.4 mm×4.8 mm and an array of 772×580 light receiving elements. In this case, the digital data converter 75 includes a shift register for sequentially transferring charges by gate control, an amplifier for voltage amplification, and an AD converter for converting the charge amount into digital data. The predetermined selection period can be determined on the basis of a time interval specified, for example, by an instruction from the operation panel 14 or by an instruction by the measurement control unit provided in the CPU+program+memory 9. As described above, the predetermined selection period is determined on the basis of the predetermined scan period, the number of reaction spot array elements, the number of reaction spots of each of the reaction spot array elements, type of light emission, the reagent, the mode of light emission, characteristics of the light receiving unit, reaction time in the reaction spot, an optical state, lifetime, or the stable light reception available time. Accordingly, the predetermined selection period is determined in accordance with the light measurement mode taking into consideration the scanning speed between the reaction spots, the predetermined scan period, the distance between the reaction spots, or the moving manner by the measuring end moving mechanism 65. For example, measurement is performed toward 50 particles having a diameter of 1 mm so as to scan in the Z-axis direction using an optical fiber having a diameter of 1 mm provided at the measuring end. In this case, it is preferable that a plurality of times (in this example, 10 times) of measurements are performed toward one particle by relatively and intermittently moving the measuring end with, for example, the distance from the light receiving position to the next light receiving position being 0.1 mm, and while stopping for the light receiving time (stop time needed for photon counting) for 10 msec in consideration of plateau chemiluminescence. This is in consideration of uncertainty based on the fact that the position of the particle is not necessarily fixed, the size of the optical fiber, or the like. This results in acquisition of a luminance of Gaussian function type emission for one particle, enabling precise measurement such as light emission. For this purpose, measurement control unit 92 causes the dispensing element Z-axis moving mechanism 42 and the storage unit 97 to generate pulse signals of such timing. This allows 500 times of light reception or digital data conversion to be performed in about 30 seconds to about 50 seconds (considering the plateau chemiluminescence) including the movement time, for 50 particles as a whole.

As illustrated in FIGS. 2 and 3, the storage unit group region 31 further includes the plurality of (16 in this example) light guiding paths $61_1$ to $61_{16}$ each including a measuring end provided so as to be able to come into contact with the thin tube of each of the dispensing tips, and including the connecting ends supported at the connecting end arrangement plate of the light guiding path selector 731. The measuring end is arranged and supported on a measuring end support body 631 in the X-axis direction at intervals corresponding to the arrangement of the reaction spot array elements.

Moreover, for the storage unit group region 31, there is provided, in the processing head 521, the measuring end moving mechanism 65 that enables scanning of the reaction spots by configuring the measuring end support body 631, namely, the plurality of (16 in this example) measuring end, to be movable in the Z-axis direction, that is, the axial direction of the dispensing tip. In this example, since the processing head is arranged in the housing 12 so as to be stationary in the Y-axis direction, the measurement head is also arranged so as to be stationary with respect to the storage unit group region 31, so as to be limitedly movable by the measuring end moving mechanism 65 solely in the Y-axis direction for coming close to and separating from the dispensing element.

Measurement processing is to be allowed solely in a case where the measuring end moves the storage unit group such that the dispensing element comes above the storage unit 30c provided on the rear end side of the storage unit group in the Y-axis direction.

The measuring end moving mechanism 65 includes, for example: an arm member connected to the measuring end support body 631; an arm holder that slidably holds the arm member and includes an elastic member configured to constantly elastically bias the arm member to advance toward the dispensing tip in the Y-axis direction; a motor to rotationally drive a nut portion screwed with a ball screw to allow the ball screw to move vertically so as to allow the arm holder to move in the Z-axis direction; a base to which a motor is attached, to which a hole through which the ball screw passes is provided, and being fixed to the bottom 12a; the ball screw screwed with the nut portion rotationally driven by the motor, vertically driven with a distal end thereof being pivotably supported to the lower portion of the arm holder; a guide pillar having a lower end provided at the base, penetrating the arm holder, and having an upper end thereof attached to a fixture; and a fixture attached on the housing (not illustrated).

With this configuration, the stage 13 is moved with the processing in the Y-axis direction being performed, until finally each of the dispensing tips reaches the reaction container 31c as the liquid storage unit, and at this time, each of the thin tubes of the dispensing tip presses the measuring end to come in contact under elastic repulsion.

Accordingly, movement of the measuring end support body 631 in the Z-axis direction causes the measuring ends $62_1$ to $62_{16}$ arranged in accordance with the arrangement of the reaction spot array elements $21_1$ to $21_{16}$ to move in the Z-axis direction with respect to each of the array elements $21_1$ to $21_{16}$ so as to scan the particles corresponding to the reaction spots 22 belonging to each of the reaction spot array elements $21_1$ to $21_{16}$ all together sequentially by coming in proximity of or separated from the particles. In this case, the measuring end support body 631 moves so as to be sequentially positioned on each of the plurality of (five in this example) predetermined measurement positions provided for every 0.2 mm corresponding to each of the reaction spots 22 (particles each having a diameter of 1 mm) of each of the reaction spot array elements at a predetermined scan period (ts, 0.8 seconds in this example).

The processing head 521 further includes a magnetic force mechanism 44 for exerting a magnetic force in the thin tube 41a of the dispensing tip attached to the nozzle. The magnetic force mechanism 44 includes, for example: sixteen permanent magnets arranged in the X-axis direction at intervals corresponding to the arrangement of the dispensing tips; a magnet arrangement member for supporting the sixteen permanent magnets; a ball screw provided in the Y-axis direction so as to allow the magnet arrangement member to reciprocate with respect to the dispensing tip, one end of the ball screw being rotatably supported by the magnet arrangement member and the other end of the ball screw being pivotably supported by a ball screw shaft support plate; an actuator incorporating a motor configured to rotationally drive a nut portion to be screwed with the ball screw, being supported by the processing head 521, and configured to move the ball screw in the front and rear direction in the Y-axis direction; and two connecting rods for connecting the ball screw shaft support plate with the magnet arrangement member by penetrating through the actuator (not illustrated).

Figure 6:
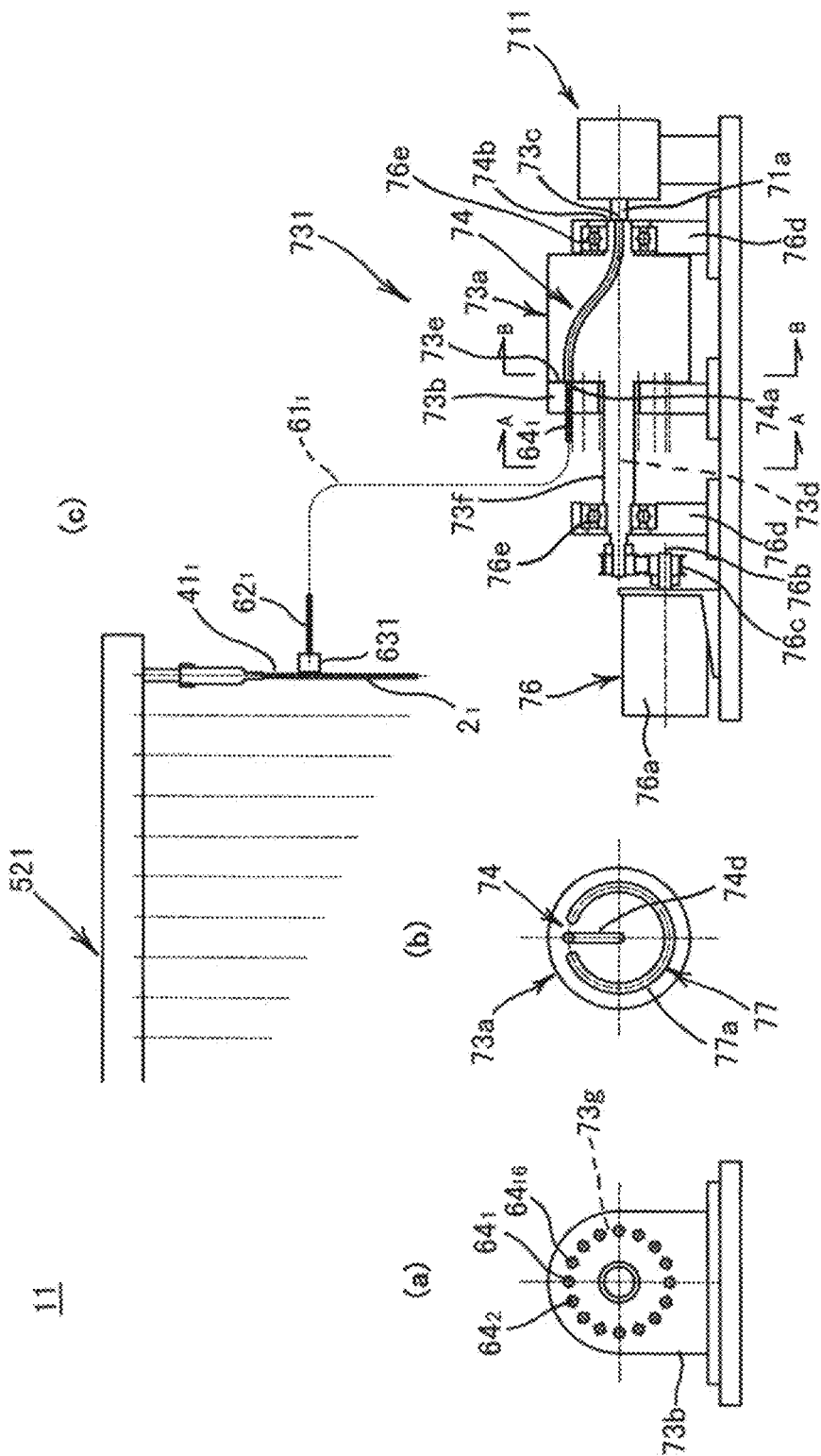
FIG. 6 is a detailed cross-sectional view of a light guiding path selector according to the first embodiment of the present invention.
Figure 7:
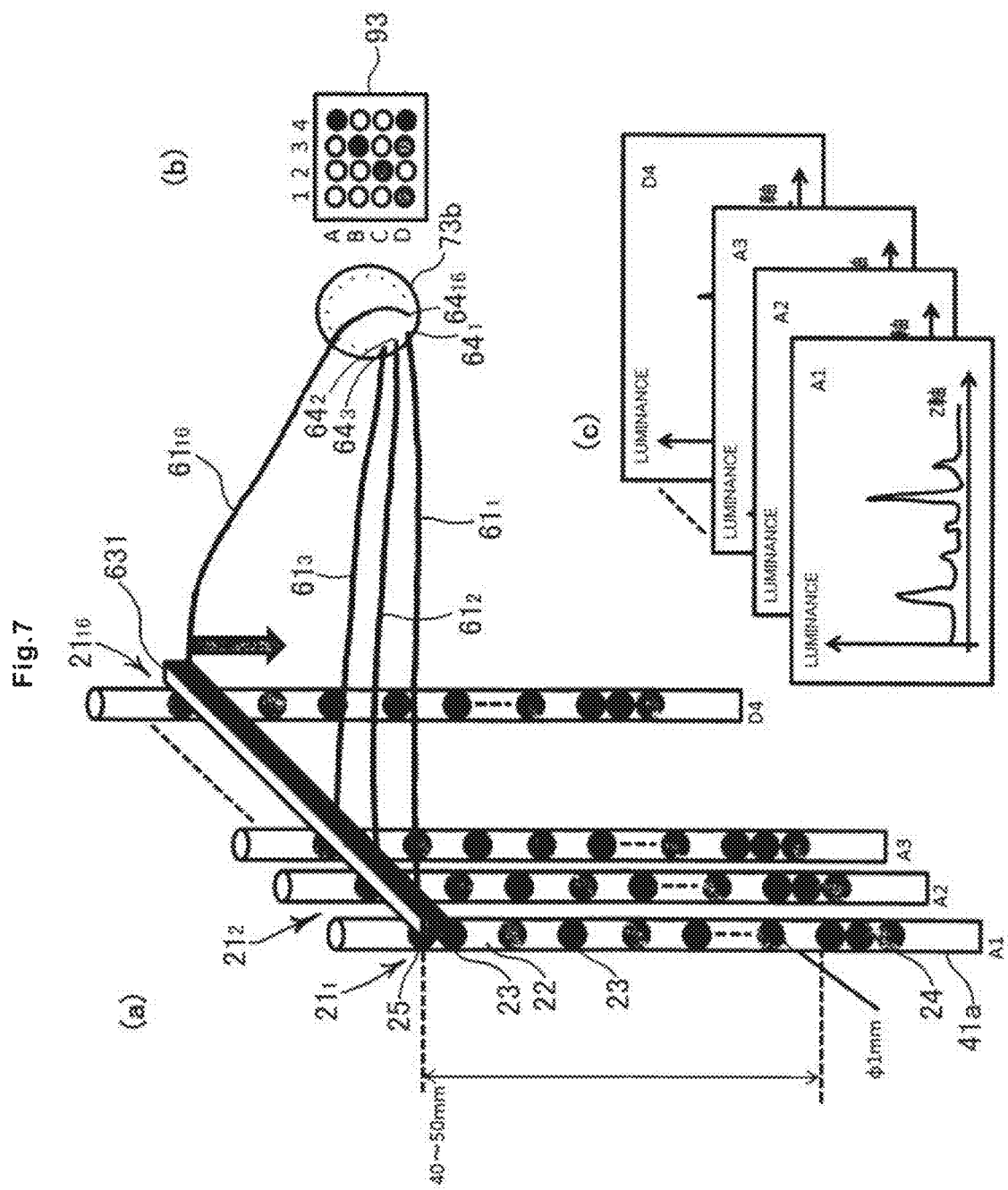
FIG. 7 is an explanatory diagram illustrating operation of the multiple reaction parallel measurement apparatus according to an embodiment of the present invention.

FIGS. 6(*a*), 6(*b*) and 6(*c*) illustrate the light guiding path selector 731 in detail.

As illustrated in FIG. 6(*c*), the light guiding path selector 731 includes the connecting end arrangement plate 73*b*, the rotating body for selection 73*a*, and the rotation drive mechanism 76. The connecting end arrangement plate 73*b* supports the connecting ends of the plurality of (16 in this example) light guiding paths $61_1$ to $61_{16}$ arranged equiangularly at a predetermined center angle (22.5 degrees in this example) along the circumference. The rotating body for selection 73*a* includes a switching light guiding path 74 as the light guiding region and provided so as to have a rotation axis 73*d* concentric with the circumference of the connecting end arrangement plate 73*b*. The rotation drive mechanism 76 is capable of rotational driving of the rotating body for selection 73*a* continuously or intermittently at the predetermined selection period (tc). The light guiding region at least includes the switching light guiding path 74 including a first end 74*a* and a second end 74*b*. The first end 74*a* is provided sequentially, continuously or intermittently, optically connectably to the connecting ends of the light guiding paths $61_1$ to $61_{16}$ at the predetermined selection period. The second end 74*b* is optically connected to the light receiving surface via a light guiding unit 71*a* of the light receiving unit 711.

FIG. 6(*a*) illustrates the connecting end arrangement plate 73*b* seen from the arrow direction of line AA in FIG. 6(*c*). The first end 74*a* is arranged on a circumference concentric to and having a same diameter as the circumference 73*g* of the connecting end arrangement plate 73*b*, on which the connecting ends $64_1$ to $64_{16}$ are arranged, on a first end arrangement surface 73*e* defined so as to be in proximity of the connecting end arrangement plate 73*b* in parallel, and the second end 74*b* is arranged on a second end arrangement point 73*c* defined on the rotation axis 73*d*.

The rotating body for selection 73*a* has a rotary shaft 73*f* provided along a rotation axis 73*d* and both ends of the rotating body for selection 73*a* are pivotably supported by a pivot supports 76*d* via bearings 76*e*. The rotary shaft 73*f* is rotatably connected to a shaft 76*b* of the motor 76*a* via a coupling 76*c*.

FIG. 6(*b*) illustrates the inside of the rotating body for selection 73*a* seen from the arrow direction of line BB in FIG. 6(*c*). The rotation body for selection 73*a* is a solid cylindrical body. At a portion where the switching light guiding path 74 is provided, a groove 74*d* is formed as a recess along the radius of the circumference 73*g* of the connecting end arrangement plate 73*b* so as to extend radially from the rotation axis 73*d*, and a groove 77*a* is formed as a recess to extend as the light absorbing region 77 without intersecting the groove 74*d*, having an arcuate opening along the circumference 73*g*, with its depth extending in the direction of the rotation axis 73*d* and the depth being shorter (for example, a length of 90% of the length) than the length in the axial direction of the rotating body for selection 73*a*. A material such as carbonized cotton or black fiber is filled in an inner portion of the groove 77*a*.

Subsequently, operation of the multiple reaction parallel measurement apparatus 11 according to the embodiment in a case where specific SNPs related to the effect of a predetermined drug are tested on the genome of 16 subjects so as to perform validity check of whether to use the drug will be described.

In the tip storage unit group 31*a*, an extraction dispensing tip, a PCR dispensing tip, a drilling tip, and the dispensing tips $41_1$ to $41_{16}$ enclosing the reaction spot array elements $21_1$ to $21_{16}$ are stored in advance with the attachment openings facing upward. In each of the liquid storage units of the liquid storage unit group 31*b*, specimens such as oral mucous membranes collected from the subject, genome extraction reagents, magnetic particle suspensions, primer-containing solutions as PCR reagents, restriction enzyme solution, etc., mineral oil, and cleaning solution are stored beforehand in order, and some of the storage units are empty. A temperature-controllable reaction container such as a PCR container is also provided. It is assumed that, in the dispensing tips $41_1$ to $41_{16}$, probes each having two types of base sequences of polymorphisms at a plurality of positions of SNPs related to the drug are attached to each of the particles while sandwiching appropriate spacer particles (or light shielding particles). Each of the particles has a spherical shape, for example, and the diameter of 1 mm, for example.

In step S1, the processing head 521 is moved in the Y-axis direction by the processing head moving mechanism 53 to be positioned above a first tip storage unit of the tip storage unit group 31*a* storing unused extraction dispensing tip. By lowering the sixteen nozzles provided in the processing head 521 by the dispensing element Z-axis moving mechanism 421, the extraction dispensing tip is attached, and the nozzles are raised again. When the lower end of the dispensing tip reaches above the tip storage unit, the nozzle moves in the Y-axis direction.

In step S2, the processing head 521 is moved to the position of one liquid storage unit belonging to the liquid storage unit group 31*b* storing the genome extraction reagent, and the processing head 521 is lowered to allow the distal end of the dispensing tip to be inserted into the liquid storage unit, and the corresponding extraction reagent is sucked all together using the suction and discharge mechanism 431. The dispensing tip is transported to one liquid storage unit of the liquid storage unit group 31*b* storing the specimen solution to allow the dispensing tip to discharge by inserting the lower end of the dispensing tip into the liquid storage unit. Furthermore, in a similar manner, a magnetic particle suspension which is contained in one liquid storage unit of the liquid storage unit group 31*b* and is used for extracting the DNA of each of the subjects as a target substance is sucked into the dispensing tip. Subsequently, the sucked magnetic particle suspension is transported to the liquid storage unit in which the specimen solution is stored and then, discharged. By repeating suction and discharge to perform agitation, the DNA of each of the subjects as a target substance is allowed to be linked with the magnetic particle. If necessary, suction and discharge are further repeated with a cleaning solution in order to remove contaminants.

In step S3, using the actuator of the magnetic force mechanism, the magnet arrangement member (not illustrated) is brought close to the extraction dispensing tip to allow the magnet come in proximity of the thin tube of the dispensing tip. This applies a magnetic field to the inside of the thin tube to allow the magnetic particles to which the DNA of each of the subjects is linked to be adsorbed on the inner wall of the thin tube and separated. While being adsorbed on the inner wall, the separated magnetic particles are transported by the processing head 521 to the next one liquid storage unit storing the dissociation liquid of the liquid storage unit group 31*b*. By repeating the suction and discharge of the dissociation solution while the magnet arrangement member is being separated from the extraction dispensing tip using the magnetic force mechanism, the DNA of each of the subjects as a target substance is suspended in the dissociation solution. Then, the processing head 521 is moved by the magnetic force mechanism with the magnetic particles being adsorbed to the inner wall again in the tip storage unit group 31*a*, and the extraction dispense tip is detached from the nozzle by lowering the tip detaching plate 43*e*, so as to be discarded.

In step S4, an unused PCR dispensing tip stored in one tip storage unit of the tip storage unit group 31*a* is lowered by the dispensing element Z-axis moving mechanism 421 of the processing head 521, thereby allowing the nozzle to be fitted to be attached to the attachment opening of the dispensing tip. The tip is then raised to move the processing head 521 in the Y-axis direction and sucks the DNA solution stored in the liquid storage unit of the liquid storage unit group 31*b* by the suction and discharge mechanism 431. The dispensing tip is then raised by the dispensing element Z-axis moving mechanism 421 to reach the PCR liquid storage unit provided at the liquid storage unit group 31*b*, and allowed to discharge the DNA solution. Similarly, a reagent solution such as a primer having a corresponding base sequence for amplifying a base sequence containing each of SNPs is discharged into the reaction container for PCR. By a predetermined temperature control cycle based on the PCR method, amplification is performed to generate the DNA fragment having a base sequence containing each of the SNPs.

In step S5, the generated DNA fragment solution containing various SNPs is dispensed, by the PCR dispensing tip, into one liquid storage unit provided in the liquid storage unit group 31*b* storing chemiluminescent substance solution connected with an adapter having a base sequence complementary to a base sequence specific to each of the DNA fragments, and then, agitated to label the various SNPs with a chemiluminescent substance. Here, detection is performed by the CLEIA method using enzyme and horseradish peroxidase (HRP) as the chemiluminescent substance, and using luminol/hydrogen peroxide as the substrate.

In step S6, the processing head 521 is returned to the tip storage unit group 31*a* again, and the attached PCR dispensing tip is detached and discarded in the empty tip storage unit by the tip detaching plate 43*e*.

In step S7, the processing head 521 is raised, and thereafter, moved in the Y-axis direction again to be positioned above one tip storage unit located in the tip storage unit group 31*a*, that is, the tip storage unit containing the dispensing tips $41_1$ to $41_{16}$ enclosing the reaction spot array elements $21_1$ to $21_{16}$. By lowering the nozzle by the dispensing element Z-axis moving mechanism 421, the dispensing tips $41_1$ to $41_{16}$ are attached to the nozzle by fitting the nozzle to the attachment opening.

In step S8, the dispensing tips $41_1$ to $41_{16}$ are moved in the Y-axis direction to be located above the liquid storage unit of the liquid storage unit group 31*b* of the storage unit groups $31_1$ to $31_{16}$ storing various types of labeled SNP fragments. The distal ends of the dispensing tips $41_1$ to $41_{16}$ are inserted into the liquid storage unit using the dispensing element Z-axis moving mechanism 421, and suction and discharge are repeated by the suction and discharge mechanism 431. This operation allows the reaction spot array elements $21_1$ to $21_{16}$ having the particulate carriers to undergo catalytic reaction with the solution. At this time, according to an instruction from the extraction-reaction control unit 91, the temperature raising and lowering body 81 advances to and comes in close contact with the dispensing tips $41_1$ to $41_{16}$ by the motor as the raising and lowering body reciprocation drive mechanism 82, thereby maintaining the interior of the dispensing tips $41_1$ to $41_{16}$ at a predetermined temperature.

In step S9, the dispensing tips $41_1$ to $41_{16}$ are moved in the Y-axis direction using the processing head moving mechanism 53 to reach one liquid storing portion storing the cleaning solution of the liquid storage unit group 31*b*, and is cleaned by repeating suction and discharge in a state where the temperature raising and lowering body 81 is separated from the dispensing tips $41_1$ to $41_{16}$. FIG. 3 illustrates the positions of the dispensing tips $41_1$ to $41_{16}$, the measuring ends $62_1$ to $62_{16}$, and the temperature raising and lowering body 81 in step S9 at this stage.

In step S10, the dispensing tips $41_1$ to $41_{16}$ are moved to reach the reaction container 31*c* storing the substrate for chemiluminescence to allow the distal end to be inserted into the reaction container 31*c*. At that time, using the measuring end moving mechanism 65, the dispensing tips $41_1$ to $41_{16}$ are moved in the Y-axis direction so as to be in a state where the measuring ends $62_1$ to $62_{16}$ come into contact with the thin tubes of the dispensing tips $41_1$ to $41_{16}$. Moreover, the temperature raising and lowering body 81 advances to and comes in close contact with the dispensing tips $41_1$ to $41_{16}$ by the motor as the raising and lowering body reciprocation drive mechanism 82, thereby maintaining the interior of the dispensing tips $41_1$ to $41_{16}$ at a predetermined temperature. The state at this stage corresponds to FIG. 4.

In step S11, the solution in the reaction container 31*c* is sucked by the dispensing tips $41_1$ to $41_{16}$. Then, the sucked substrate reacts with the enzymes of the reaction spot array elements $21_1$ to $21_{16}$ enclosed in the dispensing tips $41_1$ to $41_{16}$ to emit light.

Thereafter, by moving the measuring end support body 63 in the Z-axis direction by the measuring end moving mechanism 65, light guiding of the corresponding reaction spots arranged in the reaction spot array elements $21_1$ to $21_{16}$ are successively all together performed from the measuring ends $62_1$ to $62_{16}$ to the connecting ends $64_1$ to $64_{16}$ toward the reaction spot array elements $21_1$ to $21_{16}$ through the light guiding paths $61_1$ to $61_{16}$.

In step S12, on the basis of the optical states corresponding to 50 spots, light is sequentially received in accordance with the movement of the measuring ends $62_1$ to $62_{16}$ by the measuring end moving mechanism 65 in the Z-axis direction. With the relative movement of the measuring ends $62_1$ to $62_{16}$, for example, a movement including intermittent repetition of movement at 800 msec and stoppage time (ts: predetermined scan period) within a distance 0.2 mm between the predetermined measurement positions, it is possible to achieve five times of light reception for one particle having a diameter of 1 mm at the predetermined measurement position. By sequentially selecting the sixteen light guiding paths $61_1$ to $61_{16}$ at the predetermined selection period (tc) by the light guiding path selector 731 during the predetermined scan period (ts), it is possible to allow one light receiving unit 711 to perform light reception at each of the reaction spots of the whole reaction spot array elements. In this case, the rotating body for selection 73*a* of the light guiding path selector 731 intermittently rotates while stopping at a predetermined selection period (tc), namely, 800 msec/16=50 msec. In other words, the scanning speed in the Z-axis direction of the measuring end is an intermittent movement of 0.25 mm per second, and the rotation speed of the rotating body for selection is intermittent rotation of 75 rotations per minute synchronized with the movement of the measuring end.

At this time, according to an instruction from the measurement control unit 92, the digital data converter 75 converts the intensity or luminance of the light received by the light receiving unit 711 at the predetermined selection period into corresponding digital data so as to be sequentially stored in the storage unit 93. The stored data is read out by the analysis unit 94, and undergoes calculation analysis to be applicable to test the target biological substance as a test target. Here, the "predetermined scan period (ts)" is determined on the basis of light measurement modes, for example, a moving time needed for relative movement between adjacent measurement positions of the measuring end by the measuring end moving mechanism (for example, 800 msec, between adjacent predetermined positions), the number of times of light reception (five times, for example) for each of the reaction spots, the number of reaction spots (50 spots, for example), and the stable light reception available time capable of stably receiving chemiluminescence (time in which light plateau state is maintained, for example, 200 seconds). The determined "predetermined scan period (ts) leads to determination of the stoppage time for light reception (digital data conversion) for the reaction spot to be set to, for example, 800 msec, so as to be instructed by the measurement control unit 92. Meanwhile, the "predetermined selection period" is determined on the basis of the predetermined scan period (ts) and the number of reaction spot array elements (n), for example.

Next, operation when the multiple reaction parallel measurement apparatus 11 according to the embodiment is applied to detection of specific food allergen on sixteen types of food specifically for the total of 24 items including seven mandatory labeling category items (egg, milk, wheat, buckwheat, peanut, shrimp/prawn, and crab) and 17 items among 20 recommended labeling category items (peaches, pork, chicken, beef, abalone, etc.).

In the tip storage unit of the tip storage unit group 31a, the drilling tip and the dispensing tips $41_1$ to $41_{16}$ enclosing the reaction spot array elements $21_1$ to $21_{16}$ are stored in advance with the attachment openings facing upward. Individual particles as the 50 reaction spots 22 of the reaction spot array element are constituted with 25 reaction beads and 25 light shielding beads. The reaction beads are alternately arranged with light shielding beads, and an antibody capable of capturing allergens (for example, anti-wheat antibody and anti-egg antibody) are immobilized onto the 24 reaction beads.

One of the reaction beads is a reaction bead for negative control or positive control. The reaction beads of the negative control are blocked from a light source or from being linked with an antibody. Reaction beads for negative control include reaction beads immobilized with horseradish peroxidase that is sure to produce luminescence. Moreover, each of the liquid storage units of the liquid storage unit group 31b, includes in advance with, in order of description: a liquid storage unit containing which 100 µL of a food extract liquid extracted from food; a liquid storage unit containing 200 µL of horseradish peroxidase (HRP labeled) solution as a labeling antibody; two sets of three liquid storage units each containing 200 µL cleaning buffer solution (1×PBS 0.05% Tween); a liquid storage unit containing 200 µL of substrate II; and a liquid storage unit containing 200 µL of substrate I (Substrate I, Substrate II: Super Signal® WEST femto Maximum Sensitivity Substrate).

In step S21, the processing head 521 is moved in the Y-axis direction by the processing head moving mechanism 53 to be positioned above the first tip storage unit of the tip storage unit group 31a containing the dispensing tips $41_1$ to $41_{16}$ enclosing the reaction spot array elements $21_1$ to $21_{16}$. By lowering the sixteen nozzles provided in the processing head 521 by the dispensing element Z-axis moving mechanism 421, the dispensing tips $41_1$ to $41_{16}$ are attached, and the nozzles are raised again. When the lower end of the dispensing tips $41_1$ to $41_{16}$ reaches above the tip storage unit group 31a, the nozzle moves in the Y-axis direction.

In step S22, the dispensing tips $41_1$ to $41_{16}$ are moved to the position of the first liquid storage unit of a first group containing the cleaning buffer solution among the liquid storage unit group 31b and then lowered so as to allow the distal ends of the dispensing tips $41_1$ to $41_{16}$ to be inserted into the liquid storage unit. By repeating suction and discharge using the suction and discharge mechanism 431, the particulate carriers as the reaction spots 22 of the reaction spot array element stored in the dispensing tips $41_1$ to $41_{16}$ are cleaned.

In step S23, the sixteen nozzles provided in the processing head 521 are raised by the dispensing element Z-axis moving mechanism 421 and then, relatively moved in the Y-axis direction by the processing head moving mechanism 53, to be positioned above the liquid storage unit among the liquid storage unit group 31b, containing individual food extract liquids as the samples, and then, lowered to allow the distal ends of the dispensing tips $41_1$ to $41_{16}$ to be inserted into the liquid storage unit, so as to suck and discharge the food extract liquid using the suction and discharge mechanism 431. During this, the temperature raising and lowering body 81 is brought in proximity of or in contact with the dispensing tip by the raising and lowering body reciprocation drive mechanism 82, and incubation is performed for 30 minutes by the temperature controller 83. During the incubation, suction and discharge are repeated 300 times by the suction and discharge mechanism 431. With this operation, an allergen (antigen) in each of the food extract liquid is captured by an antibody immobilized on the corresponding bead.

In step S24, the sixteen dispensing tips $41_1$ to $41_{16}$ provided in the processing head 521 are raised along the Z-axis by the dispensing element Z-axis moving mechanism 421. Then, the stage 13 is moved by the processing head moving mechanism 53 in the Y-axis direction to reach second and third liquid storage units of the first group containing the cleaning buffer solution, and then, the dispensing tips $41_1$ to $41_{16}$ are lowered to allow suction and discharge to be repeatedly performed by the suction and discharge mechanism 431. This cleaning operation by repetition is repeated twice.

In step S25, the sixteen dispensing tips $41_1$ to $41_{16}$ are raised by the dispensing element Z-axis moving mechanism 421, the stage 13 is moved in the Y-axis direction by the processing head moving mechanism 53 to reach the liquid storage unit containing the labeled antibody. The dispensing tips $41_1$ to $41_{16}$ are lowered and the suction and discharge is repeated 300 times by the suction and discharge mechanism 431 so as to label allergen linked to the antibody immobilized on the beads with the HRP label.

In step S26, the sixteen dispensing tips $41_1$ to $41_{16}$ provided in the processing head 521 are raised along the Z-axis by the dispensing element Z-axis moving mechanism 421. Then, the stage 13 is moved by the processing head moving mechanism 53 in the Y-axis direction to reach first, second, and third liquid storage units of the second group containing the cleaning buffer solution, and then, the dispensing tips $41_1$ to $41_{16}$ are lowered to allow suction and discharge to be repeatedly performed by the suction and discharge mechanism 431. This cleaning by repetition is repeated three times.

In step S27, the sixteen dispensing tips $41_1$ to $41_{16}$ are raised by the dispensing element Z-axis moving mechanism 421, the stage 13 is moved in the Y-axis direction by the processing head moving mechanism 53, to once reach the tip storage unit group 31a. The dispensing tips $41_1$ to $41_{16}$ are detached using a detaching plate 43e as the detaching mechanism. Subsequently, a new dispensing tip in which the bead is not enclosed is attached and moved to the liquid storage unit containing the substrate I, sucks the substrate I. Thereafter, the dispensing tip is raised by the dispensing element Z-axis moving mechanism 421, and moves to the reaction container 31c, performs discharge, and sucks substrate II with the dispensing tip, in a similar manner, moves to the reaction container 31c and performs discharge.

In step S28, the dispensing tip is moved to the tip storage unit group 31a and detached using the detaching plate 43e as the detaching mechanism, then, moves to the position above the tip storage unit containing the dispensing tips $41_1$ to $41_{16}$, and then, is lowered to attach the dispensing tips $41_1$ to $41_{16}$ to the nozzle. The dispensing tips $41_1$ to $41_{16}$ are then moved by relative movement to be positioned above the reaction container 31c by the stage moving mechanism 531 as the processing head moving mechanism 53.

In step S29, the dispensing tip is lowered to allow the distal end to be inserted into the reaction container to suck the mixed substrates I and II. Subsequently, in order to measure the light emission after the suction, the measuring end support body 631 is moved in the Y-axis direction by the measuring end moving mechanism 65 and sequentially receives light in accordance with the movement of h the movement of the measuring ends $62_1$ to $62_{16}$ being in contact with or in proximity of the thin tube 41a of the dispensing tips $41_1$ to $41_{16}$ in the Z-axis direction. With the relative movement of the measuring ends $62_1$ to $62_{16}$, for example, a movement including intermittent repetition of movement at 800 msec and stoppage time (ts: predetermined scan period) within a distance 0.2 mm between the predetermined measurement positions, it is possible to achieve five times of light reception for one particle having a diameter of 1 mm at the predetermined measurement position. By sequentially selecting the sixteen light guiding paths $61_1$ to $61_{16}$ at the predetermined selection period (tc) by the light guiding path selector 731 during the predetermined scan period (ts), it is possible to allow one light receiving unit 711 to perform light reception sequentially at each of the reaction spots of the whole reaction spot array elements. In this case, the rotating body for selection 73a of the light guiding path selector 731 intermittently rotates while stopping at a predetermined selection period (tc), namely, 800 msec/16=50 msec. In other words, the scanning speed in the Z-axis direction of the measuring end is an intermittent movement of 0.25 mm per second, and the rotation speed of the rotating body for selection is intermittent rotation of 75 rotations per minute synchronized with the movement of the measuring end.

At this time, according to an instruction from the measurement control unit 92, the digital data converter 75 converts the intensity or luminance of the light received by the light receiving unit 711 at the predetermined selection period into corresponding digital data so as to be sequentially stored in the storage unit 93. The stored data is read out by the analysis unit 94, undergoes computational analysis to be applicable to test the target biological substance to as a test target. Here, the "predetermined scan period (ts)" is determined on the basis of light measurement modes, for example, a moving time needed for relative movement between adjacent measurement positions of the measuring end by the measuring end moving mechanism (for example, 800 msec, between adjacent predetermined positions), the number of times of light reception (five times, for example) for each of the reaction spots, the number of reaction spots (50 spots, for example), and the stable light reception available time capable of stably receiving chemiluminescence (time in which light plateau state is maintained, for example, 200 seconds). The determined "predetermined scan period (ts) leads to determination of the stoppage time for light reception (digital data conversion) for the reaction spot to be set to, for example, 800 msec, so as to be instructed by the measurement control unit 92. Meanwhile, the "predetermined selection period" is determined on the basis of the predetermined scan period (ts) and the number of reaction spot array elements (n), for example.

FIG. 7(a) illustrates an arrangement example of particles as the plurality of reaction spots 22 corresponding to the reaction spot array elements $21_1$ to $21_{16}$ arranged in the thin tube of the dispensing tips $41_1$ to $41_{16}$ in the Z-axis direction. Spacers 23 (illustrated in dark color in the drawing) are provided so as to sandwich the reaction spots 22 (indicated by light color in the figure). The diameter of each of these particles is, for example, 1 mm. The drawing schematically illustrates a state in which the measuring end support body 631 sequentially moves in the Z-axis direction from a first particle 25 to guide the light based on the optical state of each of the particles to the light receiving element array through the optical fibers as the light guiding paths $61_1$ to $61_{16}$. A lowermost particle 24 is formed of a flexible material having a slightly larger radius and provided for enclosing particles into the thin tube 41a. The uppermost particle 25 is a particle used as a marker, for example. The entire length of the portion on which the reaction spot 22 is provided for measurement is 40 mm to 50 mm, for example.

FIG. 7(b) schematically illustrates a state of storing digital data corresponding to each of image region data (image region data corresponding to digital data is drawn in the figure) by assigning for each of the reaction spot array elements $21_1$ to $21_{16}$, in the storage unit 93, corresponding to each of the reaction spot array elements $21_1$ to $21_{16}$. The connecting ends $64_1$ to $64_{16}$ of the light guiding paths $61_1$ to $61_{16}$ are arranged with the same center angle on the connecting end arrangement plate 73b. With this arrangement, even in a case where the reaction spot array elements $21_1$ to $21_{16}$ are widely arranged in a high dimension, it is possible to sequentially select the connecting ends at the predetermined selection period by arranging the connecting ends on the circumference corresponding to each of the reaction spot array element, making it possible to suppress an increase in the number of light receiving units.

FIG. 7(c) illustrates a schematic diagram in which the digital data stored in the storage unit 93 is graphed for each of the reaction spot array elements $21_1$ to $21_{16}$. By performing computational analysis of the luminance by the analysis unit 94, it is possible to output a test result for each of the specimens.

Multiple reaction parallel measurement apparatuses 100 and 101 according to a second embodiment of the present invention will be described with reference to FIGS. 8 to 10. Note that the same reference numerals as those used for the multiple reaction parallel measurement apparatuses 10 and 11 according to the first embodiment denote the same or similar items, and the description thereof will be omitted.

Figure 8:
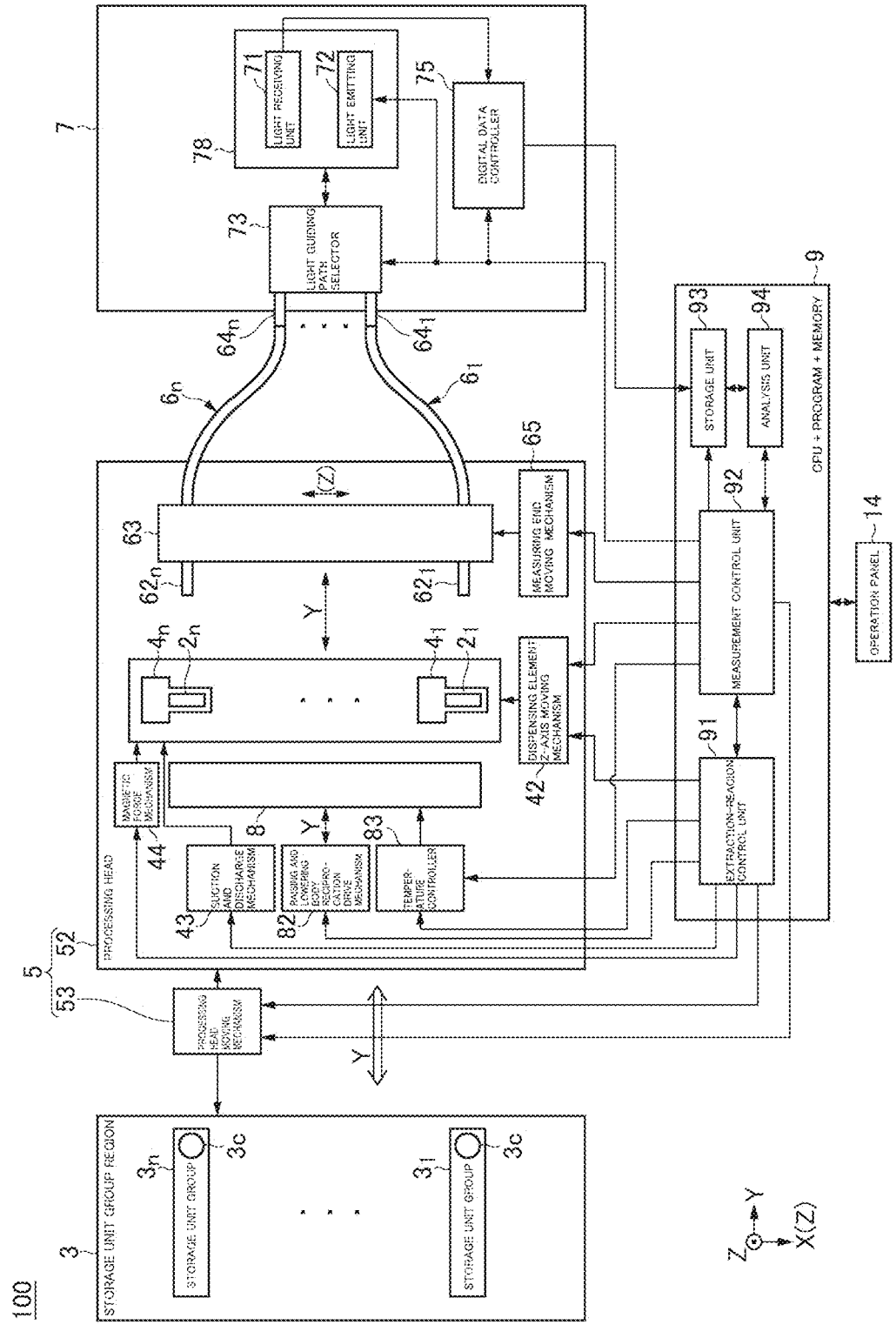
FIG. 8 is a block diagram illustrating a multiple reaction parallel measurement apparatus according to a second embodiment of the present invention.

FIG. 8 is a block diagram illustrating the multiple reaction parallel measurement apparatus 100. The multiple reaction parallel measurement apparatus 100 according to the second embodiment differs from the multiple reaction parallel measurement apparatus 10 according to the first embodiment in that a light emitting/light receiving unit 78 is provided instead of the light receiving unit 71.

The light emitting/light receiving unit 78 includes a light receiving unit 71 configured to receive and photoelectrically convert the light emitted from the light guiding region of the light guiding path selector 73, and includes a light emitting unit 72 configured to allow predetermined light (excitation light in this example) to be incident to the light guiding region selected by the light guiding path selector 73. The light emitting unit 72 emits light on the basis of an instruction from the measurement control unit 92.

Figure 9:
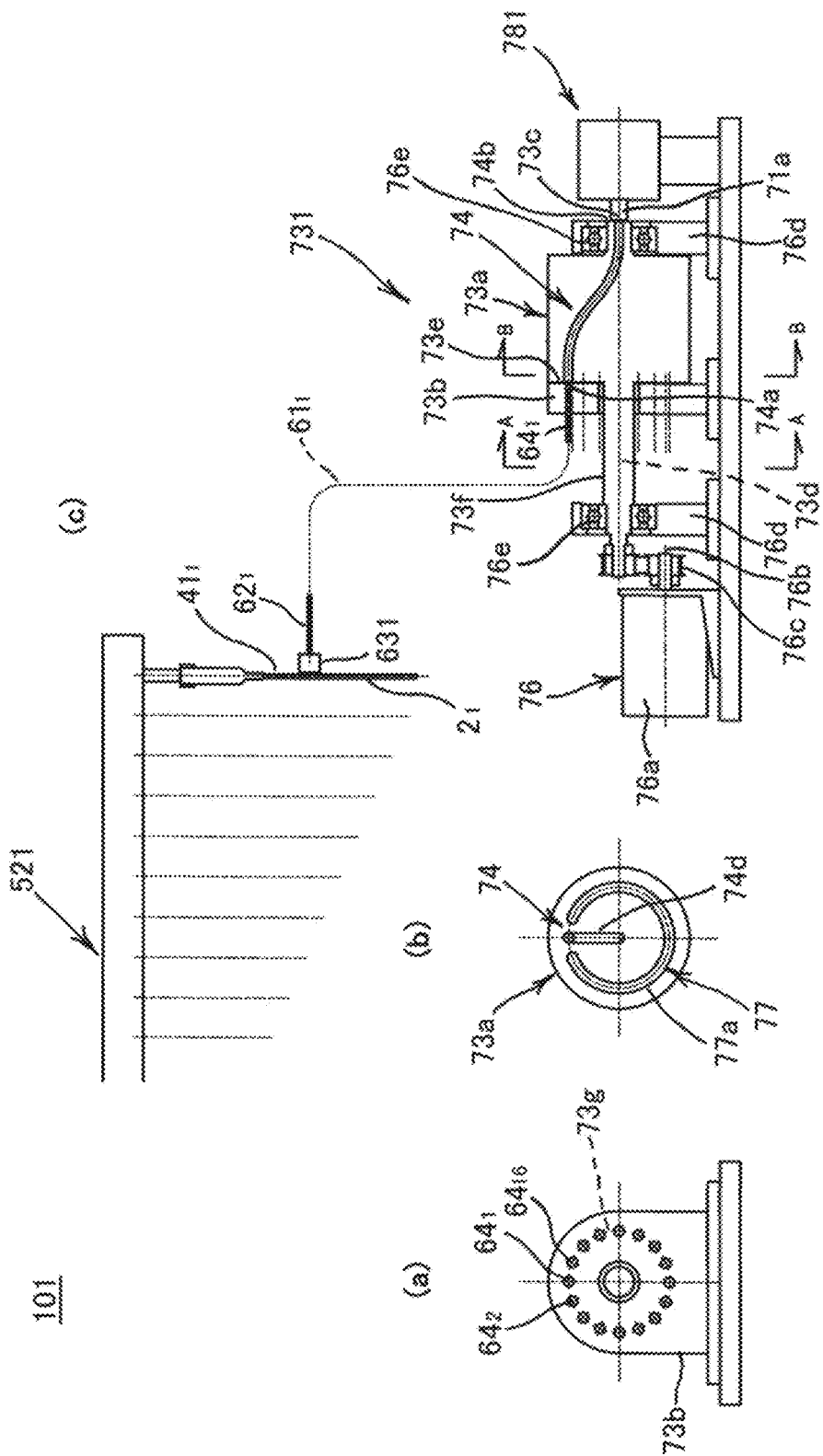
FIG. 9 is an explanatory diagram incorporating a light emitting/light receiving unit according to the second embodiment of the present invention.

FIG. 9 illustrates a state in which a light emitting/light receiving unit 781, more specific version of the light emitting/light receiving unit 78, is incorporated in the multiple reaction parallel measurement apparatus 101, more specific version of the multiple reaction parallel measurement apparatus 100. Note that the switching light guiding path 74 corresponds to the light guiding region.

Figure 10:
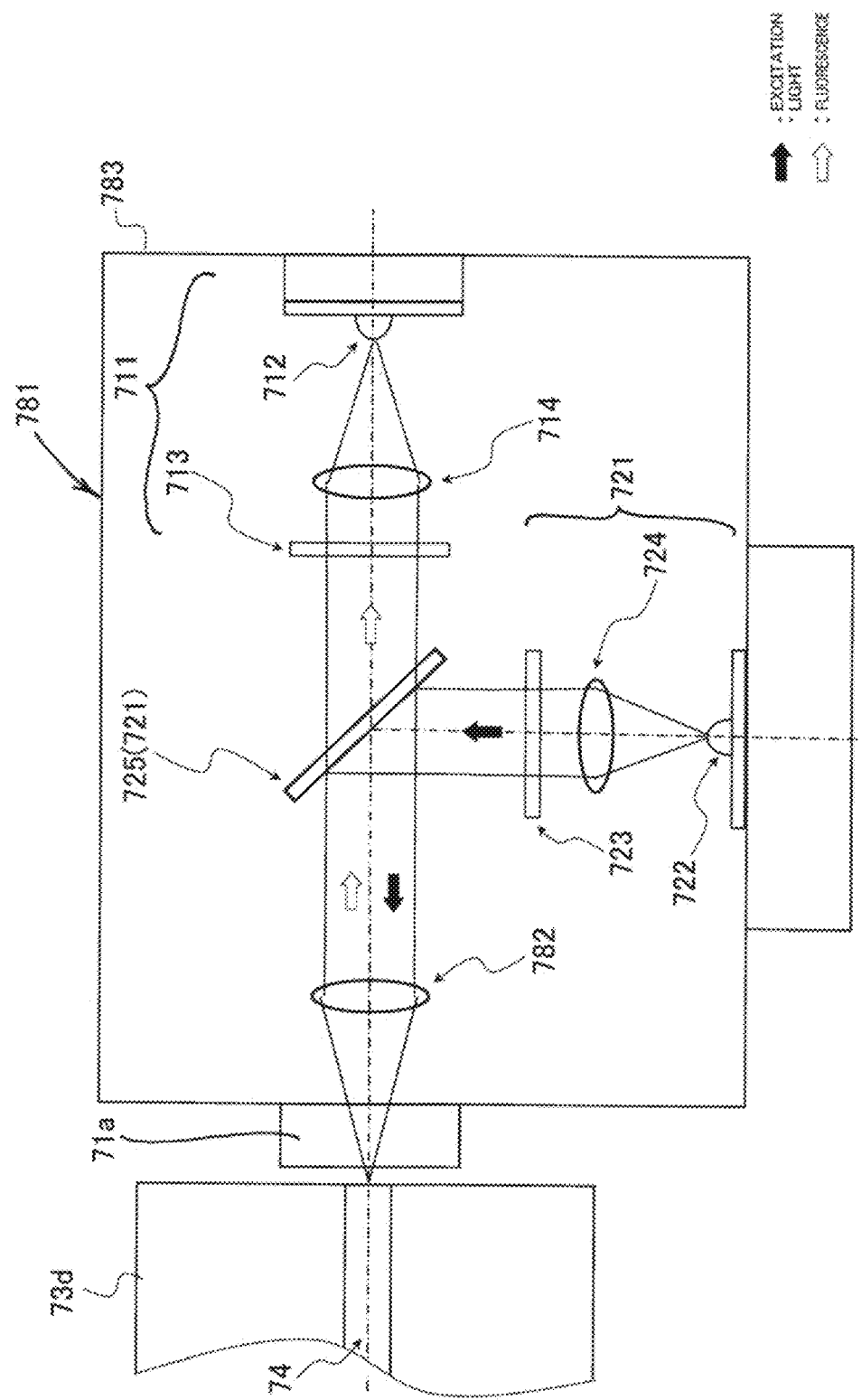
FIG. 10 is a diagram illustrating an optical system of the light emitting/light receiving unit according to the second embodiment of the present invention.

FIG. 10 illustrates an optical system element inside the light emitting/light receiving unit 781. Except for the light guiding unit 71a, the light emitting/light receiving unit 781 is provided within a housing 783 having a light shielding property for preventing the entry of external light.

The light emitting/light receiving unit 781 includes the light receiving unit 711, a light emitting unit 721, and a lens 782. The light receiving unit 711 includes a photodiode 712 as a photoelectric converter, a band pass filter 713 that exclusively transmits light of a wavelength band corresponding to the fluorescence that can be generated from a fluorescent substance included in each of the reaction spots 22, and a condenser lens 714. In contrast, the light emitting unit 721 includes an LED 722, a band pass filter 723, a lens 724, and a dichroic beam splitter 725. The band pass filter 723 exclusively transmits light of a wavelength band corresponding to the excitation light toward the fluorescent substance. The dichroic beam splitter 725 reflects the excitation light from the LED 722 so as to be guided to the lens 782 while transmitting the light from the lens 782 so as to be guided to the band pass filter 713 (while the dichroic beam splitter 725 uses, for example, a long pass dichroic beam splitter that exhibits a high reflectance for light having shorter wavelength than a cutoff wavelength, e.g., excitation light and exhibits a high transmittance for light having a wavelength longer than the cutoff wavelength, for example, fluorescence, it is also possible to design the dichroic beam splitter 725 using a short pass dichroic beam splitter having reversed reflectance and a transmittance).

Subsequently, operation of the multiple reaction parallel measurement apparatus 101 according to the present embodiment in a case where specific SNPs related to the effect of a predetermined drug are tested on the genome of sixteen subjects so as to perform validity check of whether to use the drug will be described.

In the tip storage unit group 31a, an extraction dispensing tip, a PCR dispensing tip, a drilling tip, and the dispensing tips $41_1$ to $41_{16}$ enclosing the reaction spot array elements $21_1$ to $21_{16}$ are stored in advance with the attachment openings facing upward. In each of the liquid storage units of the liquid storage unit group 31b, specimens such as oral mucous membranes collected from the subject, genome extraction reagents, magnetic particle suspensions, primer-containing solutions as PCR reagents, restriction enzyme solution, etc., mineral oil, and cleaning solution are stored beforehand in order, and some of the storage units are empty. A temperature-controllable reaction container such as a PCR container is also provided. It is assumed that, in the dispensing tips $41_1$ to $41_{16}$, probes each having two types of base sequences of polymorphisms at a plurality of positions of SNPs related to the drug are attached to each of the particles while sandwiching appropriate spacer particles (or light shielding particles). Each of the particles has a spherical shape, for example, and the diameter of 1 mm, for example.

Since the steps S1 to S4 are similar to those in the first embodiment, description thereof will be omitted.

In step S5', the generated DNA fragment solution containing various SNPs is dispensed, by the PCR dispensing tip, into one liquid storage unit provided in the liquid storage unit group 31b storing chemiluminescent substance solution connected with an adapter having a base sequence complementary to a base sequence specific to each of the DNA fragments, and then, agitated to label the various SNPs with a fluorescent substance, for example, FITC (fluorescence wavelength: 522 nm, excitation light wavelength: 498 nm)

Since steps S6 to S9 are the similar to examples in the first embodiment, description thereof will be omitted.

In step S10', the dispensing tips $41_1$ to $41_{16}$ are moved to the empty reaction container 31c so as to allow the distal end to be inserted into the reaction container 31c. At that time, using the measuring end moving mechanism 65, the dispensing tips $41_1$ to $41_{16}$ are moved in the Y-axis direction so as to be in a state where the measuring ends $62_1$ to $62_{16}$ come into contact with the thin tubes of the dispensing tips $41_1$ to $41_{16}$. Moreover, when necessary, the temperature raising and lowering body 81 advances to and comes in close contact with the dispensing tips $41_1$ to $41_{16}$ by the motor as the raising and lowering body reciprocation drive mechanism 82, thereby maintaining the interior of the dispensing tips $41_1$ to $41_{16}$ at a predetermined temperature. The state at this stage corresponds to FIG. 4.

Thereafter, in the step S11', by moving the measuring end support body 63 in the Z-axis direction by the measuring end moving mechanism 65, the corresponding reaction spots (40 beads having diameter of 1 mm for each of array elements) arranged in the reaction spot array elements $21_1$ to $21_{16}$ undergo reception of fluorescence by successively all together emitting excitation light toward the reaction spot array elements $21_1$ to $21_{16}$, specifically, from the measuring ends $62_1$ to $62_{16}$ to the connecting ends $64_1$ to $64_{16}$, all together via the light guiding paths $61_1$ to $61_{16}$ (for example, a bundle of three optical fibers having diameter of 1.5 mm).

In step S12', on the basis of the optical states corresponding to 40 reaction beads (diameter of beads 1 mm each) for each of the reaction spot array elements $21_1$ to $21_{16}$, emission of excitation light and reception of fluorescence are sequentially performed in accordance with the movement of the measuring ends $62_1$ to $62_{16}$ in the Z-axis direction by the measuring end moving mechanism 65. With the movement of the measuring ends $62_1$ to $62_{16}$ in the Z-axis direction, for example, by performing continuous movement in the distance 0.05 mm between the predetermined measurement positions at a predetermined speed of 800 msec (0.0625 mm/sec), it is possible to perform 20 times of emission of excitation light and reception of fluorescence at the predetermined measurement position for one particle having a diameter of 1 mm. Accordingly, by sequentially selecting all of the sixteen light guiding paths $61_1$ to $61_{16}$ at a predetermined selection period (tc) by the light guiding path selector 731 during the predetermined scan period (ts), the single light emitting/light receiving unit 781 sequentially perform light emission and reception for all the reaction spot array elements 21$_1$ to 21$_{16}$. In this case, the rotating body for selection 73a of the light guiding path selector 731 intermittently rotates while stopping at a predetermined selection period (tc), namely, 800 msec/16=50 msec. That is, the scanning speed of the measuring end in the Z-axis direction is a continuous movement at 0.125 mm per second, and while the rotation speed of the rotating body for selection 73a is synchronized with the movement of the measuring end, the rotation becomes intermittent rotation of 75 rotations per minute in consideration of simultaneously performing light emission and light reception.

At this time, according to an instruction from the measurement control unit 92, the digital data converter 75 converts the intensity or luminance of the light received by the light receiving unit 711 at the predetermined selection period into corresponding digital data so as to be sequentially stored in the storage unit 93. The stored data is read out by the analysis unit 94, and undergoes calculation analysis to be applicable to test the target biological substance as a test target. Here, the "predetermined scan period (ts)" is determined on the basis of light measurement modes, for example, a moving time needed for relative movement between adjacent measurement positions of the measuring end by the measuring end moving mechanism (for example, 800 msec, between adjacent predetermined positions), the number of times of light emission and reception (20 times, for example) for each of the reaction spots, the number of reaction spots (40 spots, for example), and the stable light reception available time capable of stably receiving fluorescence (while this depends on the lifetime of fluorescence and intensity of excitation light, the time is longer than chemiluminescence in typical cases). The determined "predetermined scan period (ts) leads to determination of the stoppage time for light emission and reception (digital data conversion) for the reaction spot, so as to be instructed by the measurement control unit 92. Meanwhile, the "predetermined selection period" is determined on the basis of the predetermined scan period (ts) and the number of reaction spot array elements (n), for example.

Figure 11:
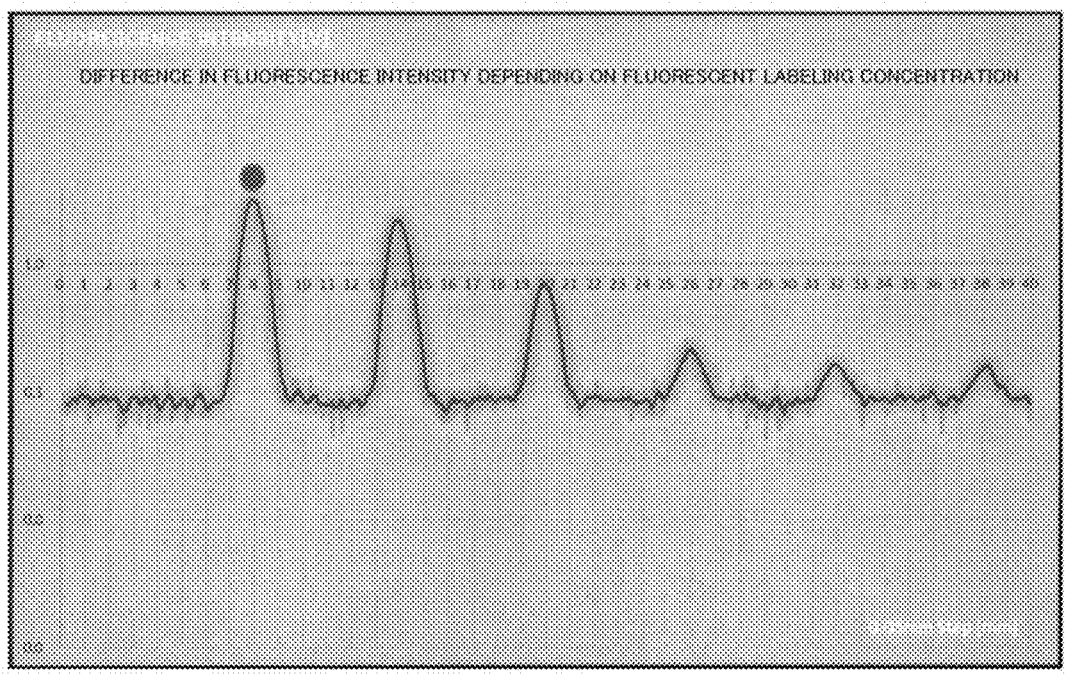
FIG. 11 is a graph illustrating a measurement example according to the second embodiment of the present invention.

FIG. 11 is a graph illustrating a difference in the fluorescence intensity depending on the fluorescent labeling concentration labeled after being attached to each of the particles (40 particles in the example, 1 mm in diameter) as the reaction spots arranged in the signal reaction spot array elements 21$_i$ (any one of i=1, 2, . . . , 16) obtained in this manner. The solid line is a graph illustrating a moving average for every five periods of the fluorescence concentration. The solid circle illustrated in the graph indicates the size of one particle labeled with a fluorescent substance as a reaction spot arranged in the reaction spot array element. The vertical axis represents fluorescence intensity (voltage value V), and the horizontal axis represents position coordinates (mm) of particles arranged in the Z-axis direction. According to the present embodiment, it is possible to perform not solely measurement of chemiluminescence but also measurement of fluorescence that needs emission of excitation light, and further possible to perform measurement of coloration, discoloration, or the like, that needs emission of various types of measurement light.

The above-described embodiments have been given specifically for the purpose of achieving better understanding of the present invention, and are not intended to limit other embodiments. Accordingly, it can be modified within a scope and spirit of the invention. For example, while the above example of the reaction spot array body describes a case where the reaction spot array elements or the reaction spots are arranged so as to have translational symmetry in two axial directions and one axial direction, the reaction spot array elements or the reaction spots may be arranged in three or more axial directions.

Moreover, while the above example describes a case where solely light emission is performed as the optical state, application is also possible in the case of coloration or light change, or the like, by receiving light generated by the coloration, light change, or the like. Moreover, the chemiluminescent reagent is not limited to the above-mentioned acridinium ester derivative, horseradish peroxidase (HRP), or the like. The fluorescence is not limited to the above-described example.

While the above example describes a case where the measuring end is combined with the processing head, application is also possible in a case where the measuring end is not provided in the processing head. Moreover, it is possible to appropriately select, add modification to, and combine the apparatuses described in individual embodiments of the present invention, components forming these apparatuses, apparatuses and reagents for forming the components. For example, a chemiluminescent substance, a reaction spot array body, a reaction spot array element, a reaction spot, a light receiving element array, a light receiving element, alight guiding path, a light guiding path selector, a digital data converter, a dispensing element, or the measurement control unit. For example, in the case of performing a test in a serum solution, by concentrating the serum solution using magnetic particles and immobilizing the antibody corresponding to each of the particles, it is possible to check the presence or absence of the antigen of each of the subjects.

While the above example describes measurement of chemiluminescence alone, it is possible to perform measurement of fluorescence.

In this application, the terms "X-axis", "Y-axis", "Z-axis", "upper", "lower", "inner", "external", "upper and lower", "row", "column" are for illustrative purposes solely and are not intended to suggest limitation to the specific spatial orientation or arrangement of the structure.

The numerical values, the number of times, the shape, the number, the amount, or the like, used in the above description are not limited to these cases. For example, while the description solely refers to the case having 16 reaction spot array elements and solely refers to the case where the number of reaction spots belonging to each of the reaction spot array elements is 50 or 40, the numbers are not limited to these.

INDUSTRIAL APPLICABILITY

The present invention relates to a multiple reaction parallel measurement apparatus and a method thereof, configured to test a specimen collected from a subject, or the like, perform optical measurement and analysis thereof, that is applicable particularly in fields demanding treatment of biological macro-molecules such as genes, immune systems, amino acids, proteins, and sugars, or small molecules, including various fields such as biochemistry fields, industrial fields, agricultural fields such as food, agriculture, and fishery processing, pharmaceutical fields, and medical fields including hygiene, insurance, immunity, diseases, and genetics.

REFERENCE SIGNS LIST 10, 11, 100, 101 Multiple reaction parallel measurement apparatus
2 Reaction spot array body
$2_1, \ldots, 2_n, 21_1, \ldots, 21_{16}$ Reaction spot array element
22 Reaction spot
3, 31 Storage unit group region
$3_1, \ldots, 3_n, 31_1, \ldots, 31_{16}$ Storage unit group
$4_1, \ldots, 4_n, 41_1, \ldots, 41_{16}$ Dispensing tip (dispensing element)
42, 421 Dispensing element Z-axis moving mechanism
43, 431 Suction and discharge mechanism
44 Magnetic force mechanism
5 Array body processing apparatus
52, 521 Processing head
53 (531) Processing head moving mechanism (stage moving mechanism)
65 Measuring end Z-axis moving mechanism
$6_1, \ldots, 6_n, 61_1, \ldots, 61_{16}$ Light guiding path
$62_1, \ldots, 62_{16}$ Measuring end
63, 631 Measuring end support body
$64_1, \ldots, 64_n$ Connecting end
7 Light receiving processing apparatus
71, 711 Light receiving unit (light receiving element array)
72, 721 Light emitting unit (LED)
73, 731 Light guiding path selector
73a Rotating body for selection
73b Connecting end arrangement plate
74 Switching light guiding path (light guiding region)
75 Digital data converter
76 Rotation drive mechanism
77 Light absorbing region
78, 781 light emitting/light receiving unit
8, 81 Temperature raising and lowering body
82 Raising and lowering body reciprocation drive mechanism
83, 85 Temperature controller
9 CPU+program+memory (information processing unit)
91 Extraction-reaction control unit
92 Measurement control unit
93 Storage unit
94 Analysis unit

The invention claimed is:

1. A multiple reaction parallel measurement apparatus comprising:
a reaction spot array having a plurality of reaction spot array elements each reaction spot array element comprising a tubular body with a plurality of spacers arranged therein, the plurality of spacers subdividing the tubular body into a plurality of reaction spots, wherein each reaction spot is located between a pair of spacers;
a plurality of light guiding paths corresponding to the plurality of reaction spot array elements, each light guiding path comprising an optical fiber having a measuring end and a connecting end, the measuring end configured to receive light emitted from the plurality of reaction spots of the corresponding reaction spot array element and to transmit the light to the connecting end;
a measurement head coupled to the plurality of measuring ends and configured to be movable relative to the reaction spot array-, wherein the measurement head travels from a first measurement position to a second measurement position during each of a plurality of predetermined scan periods;
a light guiding path selector configured to select the plurality of light guiding paths sequentially during movement of the measurement head or during stoppages at the first measurement position and the second measurement position, wherein the light guiding path selector comprises a light guiding region optically connected to the connecting end of a selected light guiding path;
a light receiving unit configured to sequentially receive the light from the light guiding region and photoelectrically convert the received light:
a digital data converter configured to sequentially obtain a plurality of sets of digital data by converting a plurality of sets of image region data obtained sequentially from the light receiving unit for each of the predetermined scan periods;
a storage unit configured to sequentially store the digital data; and
an analysis unit configured to perform a test for each of the reaction spot array elements in parallel by analyzing a temporal change of an optical state for each of the reaction spot array elements on the basis of the digital data.

2. The multiple reaction parallel measurement apparatus according to claim 1, further comprising a light emitting unit capable of emitting predetermined light onto the light guiding region, wherein the predetermined light comprises 1) an excitation light configured to permit measurement of an optical property of a fluorescent substance or 2) a reference light having a specified wavelength,
wherein the light guiding region of the light guiding path selector is capable of transmitting the predetermined light onto the connecting end of the selected light guiding path, and
wherein each of the plurality of light guiding paths is configured to transmit the predetermined light from the connecting end to the measuring end.

3. The multiple reaction parallel measurement apparatus according to claim 1, wherein the light guiding path selector further includes a light absorbing region capable of optically connecting and absorbing light transmitted from each of the connecting ends of the plurality of light guiding paths other than the selected light guiding path.

4. The multiple reaction parallel measurement apparatus according to claim 1,
wherein the light guiding path selector includes:
a connecting end arrangement plate having circumference and that arranges and supports each of the connecting ends of the plurality of light guiding paths, wherein the connecting ends are arranged in a circumferential pattern of equally spaced intervals;
a rotating body including the light guiding region, the rotating body having a rotation axis concentric with the circumference of the connecting end arrangement plate; and
a rotation drive mechanism capable of rotating the rotating body continuously or intermittently, and
wherein the light guiding region at least includes a switching light guiding path having a first end that is optically connected to the connecting end of the selected light guiding path and a second end that is optically connected to a light receiving surface of the light receiving unit, wherein the first end is located on a circumference concentric to and having a same diameter as the circumference of the connecting end arrangement plate, and wherein the second end is located on the rotation axis of the rotating body.

5. The multiple reaction parallel measurement apparatus according to claim 4, wherein the rotating body further includes a light absorbing region capable of optically connecting and absorbing light transmitted from each of the connecting ends of the plurality of light guiding paths other than the selected light guiding path.

6. The multiple reaction parallel measurement apparatus according to claim 1, wherein the plurality of spacers are arranged such that the plurality of reaction spots have translational symmetry in a direction parallel to the measurement head travel.

7. The multiple reaction parallel measurement apparatus according to claim 1, wherein one of the reaction spot array and the plurality of reaction spot array elements includes one or more test carriers on which predetermined types of test substances are fixed on a plurality of reaction spots.

8. The multiple reaction parallel measurement apparatus according to claim 1, further comprising a processing head including a plurality of dispensing elements corresponding to each of the plurality of reaction spot array elements, wherein the processing head is relatively movable with respect to a storage unit group including a plurality of storage units being arranged corresponding to each of the reaction spot array elements, and wherein a distal end of each of the plurality of dispensing elements is arranged to be insertable into each of the plurality of storage units such that suction and discharge of a liquid stored in each of the plurality of storage units is performed toward the corresponding reaction spot array element by the corresponding dispensing element.

9. The multiple reaction parallel measurement apparatus according to claim 8, wherein each of the plurality of reaction spot array elements is a test carrier and is enclosed in the corresponding dispensing element, and wherein the measurement head is configured to be movable relative to the plurality of dispensing elements.

10. The multiple reaction parallel measurement apparatus according to claim 9, wherein the measurement head is configured to be movable relative to the storage unit group in a vertical direction and movable relative to the plurality of dispensing elements in a horizontal direction.

11. A multiple reaction parallel measurement method comprising:
a reaction step of performing a chemiluminescence-related reaction in a reaction spot of a reaction spot array having a plurality of reaction spot array elements, each reaction spot array element comprising a tubular body with a plurality of spacers arranged therein, the plurality of spacers subdividing the tubular body in a plurality of reaction spots, wherein each reaction spot is located between a pair of spacers;
a measurement step of allowing light generated by the chemiluminescence-related reaction into each of the plurality of reaction spots to reach a plurality of measuring ends of a plurality of light guiding paths provided corresponding to each of the reaction spot array elements, wherein each light guiding path comprises an optical fiber configured to transmit the light from the measuring end to a connecting end, and wherein the plurality of measuring ends are coupled to a measurement head configured to be movable relative to the reaction spot array, wherein the measurement head travels from a first measurement position to a second measurement position during each of a plurality of predetermined scan periods;
a light guiding path selection step of optically connecting each of the plurality of connecting ends of the plurality of light guiding paths with a light guiding region sequentially, wherein the optical connection enables the light received at the measuring end of the selected light guiding path to be transmitted to a light receiving surface of the light receiving unit via the light guiding region;
a light receiving step of sequentially receiving the light from the light guiding region and photoelectrically converting the received light by the light receiving unit;
a digital data conversion step of sequentially converting image region data obtained from the light receiving unit into a plurality of sets of digital data and sequentially storing the converted data for each of the predetermined scan periods; and
an analyzing step of performing a test for each of the reaction spot array elements in parallel by analyzing a temporal change of an optical state for each of the reaction spot array elements on the basis of the digital data.

12. The multiple reaction parallel measurement method according to claim 11, wherein the light guiding path selection step includes a light absorption step of optically connecting and absorbing light transmitted from each of the connecting ends of the plurality of a light guiding paths other than the selected light guiding path by a light absorbing region.

13. The multiple reaction parallel measurement method according to claim 11, wherein the light guiding path selection step includes:
continuously or intermittently rotating a rotating body about a rotation axis that passes through the light receiving surface of the light receiving unit, wherein the rotating body includes a switching light guiding path having a first end and a second end, wherein the second end is located on the rotation axis; and
sequentially optically connecting the first end to the connecting end of the selected light guiding path.

14. The multiple reaction parallel measurement method according to claim 11, wherein the plurality of reaction spot array elements includes one or more test carriers on which predetermined types of test substances are fixed on a plurality of reaction spots.

15. The multiple reaction parallel measurement method according to claim 11, wherein each of the plurality of reaction spot array elements is enclosed in a translucent dispensing element capable of suction and discharge of a liquid, wherein the dispensing element is relatively movable with respect to a storage unit group in which a plurality of liquid storage units are arranged, and wherein a distal end of the translucent dispensing element is arranged to be insertable into each of the plurality of liquid storage units of the storage unit group; and
wherein the reaction step further comprises suction and discharge of a liquid stored in each of the plurality of liquid storage units by the translucent dispensing element.

16. A light guiding path selection apparatus comprising:
a connecting end arrangement plate having circumference and that arranges and supports a plurality of light guiding paths, wherein each of the plurality of light guiding paths comprises an optical fiber having a connecting end, and wherein the connecting ends are arranged in a circumferential pattern of equally spaced intervals;
a rotating body including a light guiding region configured to be sequentially optically connected with each of the connecting ends of the plurality of light guiding paths, the rotating body having a rotation axis concentric with the circumference of the connecting end arrangement plate; and a rotation drive mechanism capable of rotating the rotating body continuously or intermittently, wherein the light guiding region includes a switching optical fiber having a first end that is optically connected to the connecting end of a selected light guiding path and a second end provided opposite the first end, wherein the first end is located on a circumference concentric to and having a same diameter as the circumference of the connecting end arrangement plate, and wherein the second end is located on the rotation axis of the rotating body, and wherein the rotating body further includes a light absorbing region capable of optically connecting and absorbing light transmitted from each of the connecting ends of the plurality of light guiding paths other than the selected light guiding path.

* * * * *